(12) United States Patent
Magnan et al.

(10) Patent No.: US 10,544,512 B2
(45) Date of Patent: Jan. 28, 2020

(54) METHODS FOR TREATING LITHIUM-CONTAINING MATERIALS

(71) Applicant: NEMASKA LITHIUM INC., Québec (CA)

(72) Inventors: Jean-François Magnan, Neuville (CA); Guy Bourassa, Québec (CA); Nicolas Laroche, Pont-Rouge (CA); Gary Pearse, Ottawa (CA); Stephen Charles Mackie, Peterborough (CA); Mykolas Gladkovas, Toronto (CA); Peter Symons, Williamsville, NY (US); J. David Genders, Elma, NY (US); Geneviève Clayton, Pierrefonds (CA); Pierre Bouchard, Notre-Dame-du-Mont-Carmel (CA)

(73) Assignee: NEMASKA LITHIUM INC., Québec (CA)

( * ) Notice: Subject to any disclaimer, the term of this patent is extended or adjusted under 35 U.S.C. 154(b) by 297 days.

(21) Appl. No.: 15/119,472

(22) PCT Filed: Feb. 24, 2015

(86) PCT No.: PCT/CA2015/000115
§ 371 (c)(1),
(2) Date: Aug. 17, 2016

(87) PCT Pub. No.: WO2015/123762
PCT Pub. Date: Aug. 27, 2015

(65) Prior Publication Data
US 2017/0022617 A1  Jan. 26, 2017

Related U.S. Application Data

(60) Provisional application No. 61/943,700, filed on Feb. 24, 2014.

(51) Int. Cl.
*B01D 61/44* (2006.01)
*B01D 61/58* (2006.01)
(Continued)

(52) U.S. Cl.
CPC .............. *C25B 1/16* (2013.01); *B01D 61/025* (2013.01); *B01D 61/42* (2013.01); *B01D 61/44* (2013.01);
(Continued)

(58) Field of Classification Search
None
See application file for complete search history.

(56) References Cited

U.S. PATENT DOCUMENTS 2,331,838 A  10/1943  Lindblad et al.
2,516,109 A * 7/1950  Ellestad .................. C22B 26/12
                                                    423/179.5

(Continued)

FOREIGN PATENT DOCUMENTS

AU  2012211033  8/2012
AU  2012261548  1/2013
(Continued)

OTHER PUBLICATIONS

Ryabtsev et al, "Preparation of High-Purity Lithium Hydroxide Monohydrate from Technical-Grade Lithium Carbonate by Membrane Electrolysis," Russian Journal of Applied Chemistry, vol. 77, No. 7, 2004, pp. 1108-1116.*
(Continued)

*Primary Examiner* — Salil Jain
(74) *Attorney, Agent, or Firm* — Bereskin & Parr LLP/S.E.N.C.R.L., s.r.l.

(57) ABSTRACT

The present disclosure relates to a method for extracting lithium from a lithium-containing material. For example, the method can comprise leaching a roasted lithium-containing
(Continued)

material under conditions suitable to obtain an aqueous composition comprising a lithium compound such as lithium sulfate and/or lithium bisulfate. The aqueous composition comprising lithium sulfate and/or lithium bisulfate can optionally be used, for example, in a method for preparing lithium hydroxide comprising an electromembrane process. The roasted lithium-containing material can be prepared, for example by a method which uses an aqueous composition comprising optionally lithium sulfate and/or lithium bisulfate which can be obtained from a method for preparing lithium hydroxide comprising an electromembrane process such as a two-compartment monopolar or bipolar electrolysis process.

24 Claims, 7 Drawing Sheets

(51) Int. Cl.
  C22B 1/06        (2006.01)
  C22B 3/08        (2006.01)
  C25B 1/16        (2006.01)
  B01D 61/42       (2006.01)
  C01D 15/02       (2006.01)
  C01D 15/06       (2006.01)
  C22B 1/02        (2006.01)
  B01D 61/02       (2006.01)

(52) U.S. Cl.
  CPC ............. B01D 61/58 (2013.01); C01D 15/02
      (2013.01); C01D 15/06 (2013.01); C22B 1/02
      (2013.01); C22B 1/06 (2013.01); C22B 3/08
      (2013.01)

(56) References Cited

U.S. PATENT DOCUMENTS

| | | |
|---|---|---|
| 2,793,941 A * | 5/1957 | Estes ................. C30B 7/00 117/206 |
| 2,872,393 A | 2/1959 | Gardiner et al. |
| 3,007,771 A | 11/1961 | Mazza et al. |
| 3,214,362 A | 10/1965 | Juda |
| 3,597,340 A | 8/1971 | Honeycutt et al. |
| 3,857,920 A | 12/1974 | Grantham et al. |
| 3,899,403 A | 8/1975 | Cook, Jr. et al. |
| 4,035,713 A | 7/1977 | Kawamoto et al. |
| 4,036,713 A | 7/1977 | Brown |
| 4,207,297 A | 6/1980 | Brown et al. |
| 4,273,628 A | 6/1981 | Kidon et al. |
| 4,287,163 A | 9/1981 | Garrett et al. |
| 4,391,680 A | 7/1983 | Mani et al. |
| 4,561,945 A | 12/1985 | Coker et al. |
| 4,707,234 A | 11/1987 | Mori et al. |
| 4,723,962 A | 2/1988 | Mehta |
| 4,806,215 A | 2/1989 | Twardowski |
| 4,999,095 A | 3/1991 | Chlanda et al. |
| 5,098,532 A | 3/1992 | Thompson et al. |
| 5,129,936 A | 7/1992 | Wilson |
| 5,198,080 A | 3/1993 | Cowley et al. |
| 5,198,081 A | 3/1993 | Kanoh et al. |
| 5,227,031 A | 7/1993 | Sundblad |
| 5,246,551 A | 9/1993 | Pletcher et al. |
| 5,258,106 A | 11/1993 | Habermann et al. |
| 5,423,959 A | 6/1995 | Sundblad et al. |
| 5,445,717 A | 8/1995 | Karki et al. |
| 5,595,641 A | 1/1997 | Traini et al. |
| 6,004,445 A | 12/1999 | Genders et al. |
| 6,048,507 A | 4/2000 | Amouzegar et al. |
| 6,306,787 B1 | 10/2001 | Sato et al. |
| 6,331,236 B1 | 12/2001 | Mani |
| 6,375,824 B1 | 4/2002 | Phinney |
| 6,514,311 B1 | 2/2003 | Lin et al. |
| 6,514,640 B1 | 2/2003 | Armand et al. |
| 6,547,836 B1 | 4/2003 | Lukes |
| 6,747,065 B1 | 6/2004 | Paszkowski |
| 6,770,187 B1 | 8/2004 | Putter et al. |
| 8,431,005 B1 | 4/2013 | Zbranek et al. |
| 8,715,482 B2 | 5/2014 | Amendola et al. |
| 8,936,770 B2 | 1/2015 | Burba, III |
| 9,255,011 B2 | 2/2016 | Kawata et al. |
| 9,255,012 B2 | 2/2016 | Tiihonen et al. |
| 9,382,126 B2 | 7/2016 | Bourassa et al. |
| 9,447,480 B2 | 9/2016 | Vaughan et al. |
| 9,493,881 B2 | 11/2016 | Kosmoski et al. |
| 9,677,181 B2 | 6/2017 | Bourassa et al. |
| 10,036,094 B2 | 7/2018 | Magnan et al. |
| 2001/0040093 A1 | 11/2001 | Mani |
| 2005/0051488 A1 | 3/2005 | Nagghappan et al. |
| 2011/0044882 A1 | 2/2011 | Buckley et al. |
| 2011/0123427 A1 | 5/2011 | Boryta et al. |
| 2011/0200508 A1 | 8/2011 | Harrison et al. |
| 2011/0203929 A1 | 8/2011 | Buckley et al. |
| 2012/0107210 A1 | 5/2012 | Harrison et al. |
| 2014/0010743 A1 | 1/2014 | Kosmoski et al. |
| 2014/0023572 A1 | 1/2014 | Vaughan et al. |
| 2015/0139886 A1 | 5/2015 | Bourassa et al. |
| 2015/0364761 A1 | 12/2015 | Fukui et al. |
| 2016/0032471 A1* | 2/2016 | Magnan ............... C25B 1/16 205/510 |
| 2016/0258071 A1 | 9/2016 | Magnan et al. |
| 2016/0304988 A1 | 10/2016 | Vaughan et al. |

FOREIGN PATENT DOCUMENTS

| | | |
|---|---|---|
| CA | 504477 | 7/1954 |
| CA | 659894 | 3/1963 |
| CA | 1073847 | 3/1980 |
| CA | 1272982 | 8/1990 |
| CA | 2205199 | 1/1997 |
| CA | 2205493 | 1/1997 |
| CA | 2786317 | 7/2011 |
| CA | 2796849 | 10/2011 |
| CA | 2820112 | 6/2012 |
| CA | 2825583 | 8/2012 |
| CN | 106315625 | 1/2017 |
| CN | 106365181 | 2/2017 |
| GB | 530028 | 12/1940 |
| GB | 841989 | 7/1960 |
| GB | 845511 | 8/1960 |
| JP | 2013173629 | 9/2013 |
| SU | 310538 | 8/1974 |
| WO | 9859385 | 12/1998 |
| WO | 2010056322 | 5/2010 |
| WO | 2010103173 | 9/2010 |
| WO | 2011133165 | 10/2011 |
| WO | 2011148040 | 12/2011 |
| WO | 2011156861 | 12/2011 |
| WO | 2013140039 | 9/2013 |
| WO | 2013159194 | 10/2013 |
| WO | 2013182749 | 12/2013 |
| WO | 2014040138 | 3/2014 |
| WO | 2015058287 | 4/2015 |
| WO | 2015081385 | 6/2015 |
| WO | 2015123762 | 8/2015 |
| WO | 2013153692 | 12/2015 |
| WO | 2017144469 | 8/2017 |
| WO | 2017157906 | 9/2017 |
| WO | 2018234614 | 12/2018 |

OTHER PUBLICATIONS

English Abstract of JPWO2013153692(A1), "Method for collecting lithium", published on Dec. 17, 2015.
English Abstract of JP2009270188(A), "Method of Manufacturing High-Purity Lithium Hydroxide", published on Nov. 19, 2009.
English Abstract of JPS5443174(A), "Preparation of Lithium Hydroxide", Published on Apr. 5, 1979.
English Abstract of JP2009270189(A), "Method of Manufacturing High-Purity Lithium Hydroxide", published on Nov. 19, 2009.

(56) References Cited

OTHER PUBLICATIONS

English Abstract of JP2011031232(A), "Method of Manufacturing Lithium Hydroxide", published on Feb. 17, 2011.
Walesh, S.G. (Feb. 21, 1989) Sedimentation Basin Design, in Urban Surface Water Management, pp. 297-313, John Wiley & Sons, Inc., Hoboken, NJ, USA, DOI: 10.002/9780470172810.
English Abstract of CL2012002968 (A1), "Method for the preparation of lithium carbonate from brines containing lithium chloride which comprises contacting the salft with sodium hydroxide and then contacting with carbon dioxide", published on Jan. 11, 2013.
English Abstract of China Lithium Products Tech. Co., Ltd., "Lithium Hydroxide Purified Grade", Published on Jun. 6, 2011.
English Abstract of Scribd, "Extraction, Properties and Use of Lithium", Published on Feb. 2, 2009.
English Abstract of Sun et al., "Preparation of $Li_2CO_3$ by Gas-Liquid Reactive Crystallization of LiOH and $CO2$", Published on Jan. 31, 2012.
English Abstract of CN102030346 (A), "Preparation method for lithium carbonate", Published on Apr. 27, 2011.
English Abstract of JP62161973A, "Production of High-Purity Lithium Carbonate", Published on Jul. 17, 1987.
English Abstract of JP2004196606(A), "Method for Manufacturing High Purity Lithium Carbonate", Published on Jul. 15, 2004.
English Abstract of JP2004196607(A), "Method for Manufacturing High Purity Lithium Carbonate", Published on Jul. 15, 2004.
English Abstract of JP2009046390(A), "Production Method of High Purity Lithium Carbonate", Published on Mar. 5, 2009.
English Abstract of JP2009057278(A), "Method of Manufacturing High Purity Lithium Carbonate", Published on Mar. 19, 2009.
English Abstract of JP2010029797 (A), "Lithium Isotope Separation and Condensation Method, Apparatus, Measure, Lithium Ion Selective Permeation Membrane, and Lithium Isotope Concentrate", Published on Feb. 12, 2010.
English Abstract of KR20130092323(A), "Lithium Compound Recovering Device, Method for Recovering Lithium Compound and Lithium Compound Recovering System", published on Aug. 20, 2013.
Ryabtsev et al., "Preparation of High-Purity Lithium Hydroxide Monohydrate from Technical-Grade Lithium Carbonate by Membrane Electrolysis", Russian Journal of Applied Chemistry, vol. 77, No. 7, Feb. 2004, pp. 1108-1116.
English Translation—Machine Translation of JP2013173629(A), "Method of Producing High-Purity Lithium Hydroxide", published on Sep. 5, 2013.
English Translation—Machine Translation of JPWO2013153692(A1), "Method for Collecting Lithium", published on Dec. 17, 2015.
Abstract of PH12013501570A1, "Improved method of ore processing" published on Sep. 30, 2013.
English Translation—Machine Generated—Description of SU310538, published on Aug. 5, 1974.
Tipping et al., "Conditions Required for the Precipitation of Aluminium in Acidic Natural Waters", Wat. Res. vol. 22, No. 5, pp. 585-592, 1988. (The year of publication is sufficiently earlier than the effective U.S. filing date so that the particular month of publication is not an issue).
English Translation—Machine Generated of CN106315625(A), "Method for composite production of high-purity lithium hydroxide monohydrate, high-purity lithium carbonate and battery grade lithium carbonate", published on Jan. 11, 2017.
English Translation—Machine Generated of CN106365181(A), "Method of preparing battery-grade lithium carbonate from lithium-rich solution being high in content of impurities", published on Feb. 1, 2017.
Ogawa et al., "Effects of the Chemical Compositions of Salars de Uyuni and Atacama Brines on Lithium Concentration during Evaporation" Resource Geology, vol. 64, No. 2: 91-101, Mar. 2014.

\* cited by examiner

METHODS FOR TREATING LITHIUM-CONTAINING MATERIALS

The present application is a 35 USC 371 national stage entry of PCT/CA2015/000115 filed on Feb. 24, 2015 and which claims priority on U.S. 61/943,700 filed on Feb. 24, 2014. These documents are hereby incorporated by reference in their entirety.

The present application claims priority on U.S. 61/943,700 filed on Feb. 24, 2014, which is hereby incorporated by reference in its entirety.

The present disclosure relates to methods for extracting lithium from lithium-containing materials.

Methods for extracting lithium from lithium-containing materials which comprise leaching an acid roasted, lithium-containing material are known. For example, in such methods the lithium-containing material is roasted in the presence of an acid such as sulfuric acid to obtain the acid roasted, lithium-containing material from which the lithium can then be extracted.

According to an aspect of the present disclosure, there is provided a method for extracting lithium from a lithium-containing material, the method comprising leaching a lithium bisulfate roasted, lithium-containing material under conditions suitable to obtain an aqueous composition comprising a lithium compound.

According to another aspect of the present disclosure there is provided a method for preparing lithium hydroxide, the method comprising:
obtaining a first aqueous composition comprising lithium sulfate and/or lithium bisulfate by a method for extracting lithium from a lithium-containing material according to a method of the present disclosure; and
submitting the first aqueous composition comprising lithium sulfate and/or lithium bisulfate to an electromembrane process under suitable conditions for at least partial conversion of the lithium sulfate and/or lithium bisulfate into lithium hydroxide.

According to another aspect of the present disclosure there is provided a method for preparing lithium hydroxide, the method comprising:
obtaining a first aqueous composition comprising lithium sulfate and/or lithium bisulfate by a method for extracting lithium from a lithium-containing material according to a method of the present disclosure;
submitting the first aqueous composition comprising lithium sulfate and/or lithium bisulfate to an electromembrane process under suitable conditions for at least partial conversion of the lithium sulfate and/or lithium bisulfate into lithium hydroxide and to obtain a second aqueous composition comprising lithium sulfate and/or lithium bisulfate; and
using the second aqueous composition comprising lithium sulfate and/or lithium bisulfate as the aqueous composition comprising lithium bisulfate in a method according to the present disclosure.

According to another aspect of the present disclosure there is provided a method for preparing lithium hydroxide, the method comprising:
mixing a lithium-containing material with an aqueous composition comprising lithium bisulfate and thereby obtaining a mixture;
roasting the mixture under suitable conditions to obtain a lithium bisulfate roasted, lithium-containing material;
leaching the lithium bisulfate roasted, lithium-containing material under conditions suitable to obtain a first aqueous composition comprising lithium sulfate and/or lithium bisulfate;
submitting the first aqueous composition comprising lithium sulfate and/or lithium bisulfate to an electromembrane process under suitable conditions for at least partial conversion of the lithium sulfate and/or lithium bisulfate into lithium hydroxide and to obtain a second aqueous composition comprising lithium sulfate and/or lithium bisulfate; and
using the second aqueous composition comprising lithium sulfate and/or lithium bisulfate as the aqueous composition comprising lithium bisulfate for mixing with the lithium-containing material and to obtain the mixture.

It was found that by using the methods of the present disclosure, it was possible to replace sulfuric acid with lithium bisulfate. It was also found that, for example, it was possible to reduce the costs associated with using the acid reagent i.e. sulfuric acid. In fact, under certain circumstances, it was possible to recycle the lithium bisulfate obtained in an electromembrane process (e.g. partial conversion of lithium sulfate into lithium hydroxide) to extract lithium from a lithium-containing material. It was found that by using the methods of the present disclosure, it was possible to easily recover sulfuric acid under the form of an acidic composition that can be used for treating a lithium-containing material and/or recovering lithium sulfate from the second aqueous composition and reusing it for an electromembrane process. For example, by using such methods, lithium sulfate monohydrate ($Li_2SO_4 \cdot H_2O$) can be substantially selectively precipitated and thus easily recovered and reused.

According to another aspect of the present disclosure there is provided a method for preparing lithium hydroxide, the method comprising:
submitting a first aqueous composition comprising lithium sulfate to an electromembrane process under suitable conditions for at least partial conversion of the lithium sulfate into lithium hydroxide and to obtain a second aqueous composition comprising lithium sulfate;
optionally increasing concentration of acid in the second aqueous composition; and
using the second aqueous composition comprising lithium sulfate for reacting with a lithium-containing material.

According to another aspect of the present disclosure there is provided a method for preparing lithium hydroxide, the method comprising:
mixing a lithium-containing material with an acidic aqueous composition optionally comprising lithium sulfate and thereby obtaining a mixture;
roasting the mixture under suitable conditions to obtain a roasted, lithium-containing material;
leaching the roasted material under conditions suitable to obtain a first aqueous composition comprising lithium sulfate;
submitting the first aqueous composition comprising lithium sulfate to an electromembrane process under suitable conditions for at least partial conversion of the lithium sulfate into lithium hydroxide and to obtain a second aqueous composition comprising lithium sulfate; and
optionally increasing concentration of acid in the second aqueous composition; and
using the second aqueous composition comprising lithium sulfate as the acidic aqueous composition optionally comprising lithium sulfate for mixing with the lithium-containing material and to obtain the mixture.

According to another aspect of the present disclosure there is provided a method for preparing lithium hydroxide, the method comprising:

submitting a first aqueous composition comprising lithium sulfate to an electromembrane process under suitable conditions for at least partial conversion of the lithium sulfate into lithium hydroxide and to obtain a second aqueous composition comprising lithium sulfate; and optionally increasing concentration of acid in the second aqueous composition; and recovering lithium sulfate from the second aqueous composition and reusing it for the electromembrane process.

It was found that by using the methods of the present disclosure, it was possible to easily recover sulfuric acid under the form of an acidic composition that can be used for treating a lithium-containing material and/or recovering lithium sulfate from the second aqueous composition and reusing it for an electromembrane process. For example, by using such methods, lithium sulfate monohydrate ($Li_2SO_4 \cdot H_2O$) can be substantially selectively precipitated and thus easily recovered and reused.

According to another aspect of the present disclosure there is provided a method for treating an electromembrane process aqueous composition comprising lithium sulfate, the process comprising removing water from the electromembrane process aqueous composition under conditions suitable for substantially selectively precipitating lithium sulfate monohydrate.

According to another aspect of the present disclosure there is provided a method for extracting an alkali from an alkali-containing material, the method comprising leaching an alkali bisulfate roasted, alkali-containing material under conditions suitable to obtain an aqueous composition comprising an alkali compound.

In the following drawing, which represents by way of example only, various embodiments of the disclosure:

Figure 1:
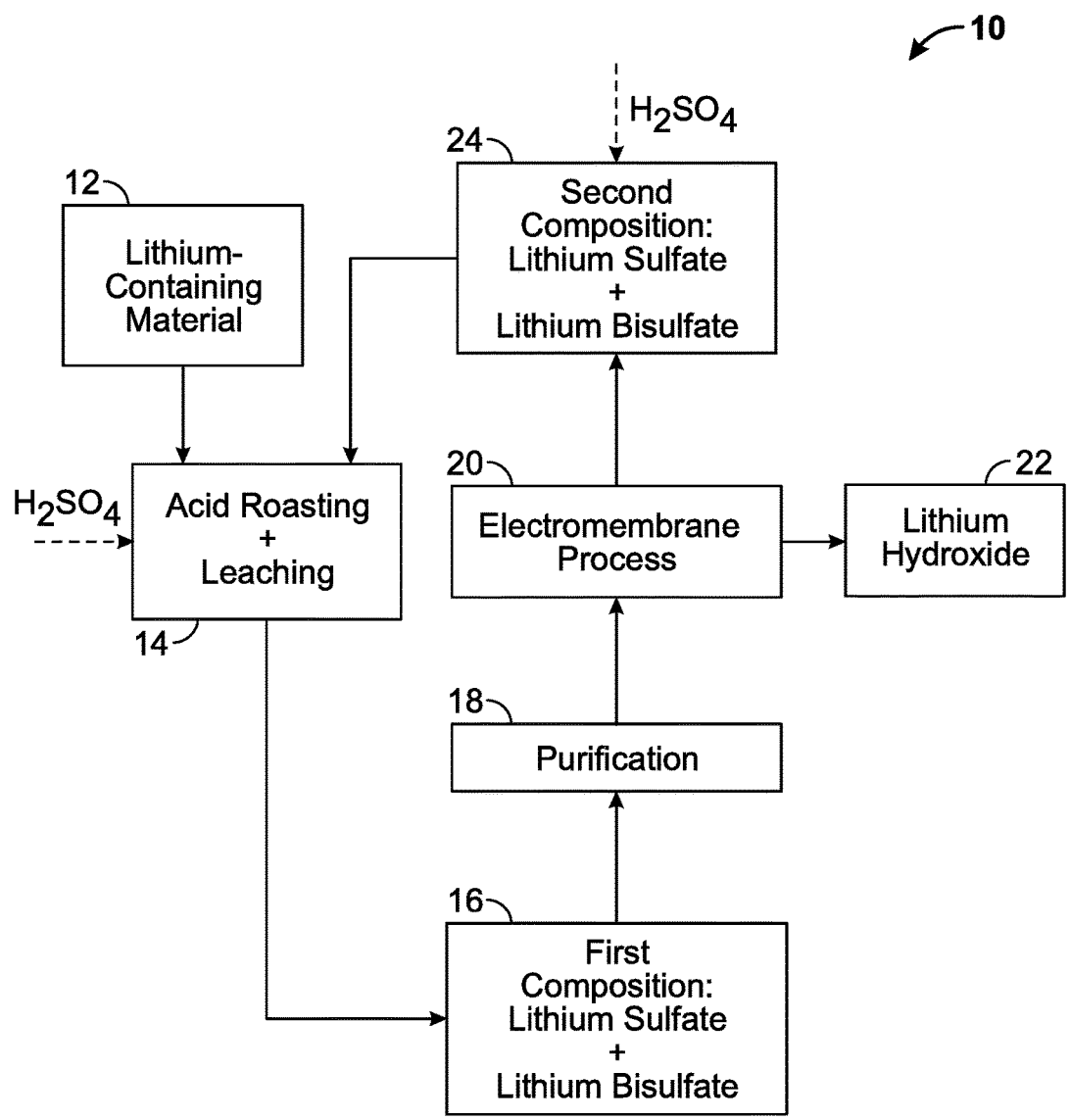
FIG. 1 is a schematic diagram of a method according to an embodiment of the present disclosure.

Unless otherwise indicated, the definitions and examples described herein are intended to be applicable to all embodiments and aspects of the present disclosure herein described for which they are suitable as would be understood by a person skilled in the art.

As used in the present disclosure, the singular forms "a", "an" and "the" include plural references unless the content clearly dictates otherwise. For example, an embodiment including "a lithium-containing material" should be understood to present certain aspects with one lithium-containing material, or two or more additional lithium-containing materials.

In embodiments comprising an "additional" or "second" component, such as an additional or second lithium-containing material, the second component as used herein is different from the other components or first component. A "third" component is different from the other, first, and second components, and further enumerated or "additional" components are similarly different.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The term "suitable" as used herein means that the selection of the particular conditions would depend on the specific manipulation or operation to be performed, but the selection would be well within the skill of a person trained in the art. All methods described herein are to be conducted under conditions sufficient to provide the desired product. A person skilled in the art would understand that all reaction conditions, including, when applicable, for example, reaction time, reaction temperature, reaction pressure, reactant ratio, flow rate, reactant purity, current density, voltage, electrode(s) material(s), concentration, pH, oxidation reduction potential, cell area, type of membrane used, and recycle rates can be varied to optimize the yield of the desired product and it is within their skill to do so.

The term "electromembrane process" as used herein refers, for example to a process that uses ion-exchange membrane(s) and an electric potential difference as the driving force for ionic species. The electromembrane process can be, for example (a membrane) electrodialysis or (a membrane) electrolysis. For example, the electromembrane process can be a membrane electrolysis.

The expression "is at least substantially maintained" as used herein when referring to a value of a pH or a pH range that is maintained during a method of the disclosure or a portion thereof (for example an electromembrane process) refers to maintaining the value of the pH or the pH range at least 75, 80, 85, 90, 95, 96, 97, 98 or 99% of the time during the method or the portion thereof.

The expression "is at least substantially maintained" as used herein when referring to a value of a voltage or a voltage range that is maintained during a method of the disclosure or a portion thereof (for example an electromembrane process) refers to maintaining the value of the voltage or the voltage range at least 75, 80, 85, 90, 95, 96, 97, 98 or 99% of the time during the method or the portion thereof.

The expression "is at least substantially maintained" as used herein when referring to a value of a current efficiency or a current efficiency range that is maintained during a method of the disclosure or a portion thereof (for example an electromembrane process) refers to maintaining the value of the electrical current efficiency or the electrical current efficiency range at least 75, 80, 85, 90, 95, 96, 97, 98 or 99% of the time during the method or the portion thereof.

The expression "is at least substantially maintained" as used herein when referring to a value of a concentration or a concentration range that is maintained during a process of the disclosure or a portion thereof (for example an electromembrane process) refers to maintaining the value of the concentration or the concentration range at least 75, 80, 85, 90, 95, 96, 97, 98 or 99% of the time during the process or the portion thereof.

The expression "is at least substantially maintained" as used herein when referring to a value of a temperature or a temperature range that is maintained during a method of the disclosure or a portion thereof (for example an electromembrane process) refers to maintaining the value of the temperature or the temperature range at least 75, 80, 85, 90, 95, 96, 97, 98 or 99% of the time during the method or the portion thereof.

An exemplary flow diagram for a method of the present disclosure is shown in FIG. 1. The method 10 exemplified therein is for preparing lithium hydroxide. Referring to FIG. 1, in the method exemplified therein, a lithium-containing material 12 such as a lithium-containing ore such as β-spodumene can be mixed with an aqueous composition comprising lithium bisulfate and/or lithium sulfate so as to obtain a mixture. In acid roasting and leaching steps 14 the mixture can then be roasted under suitable conditions to obtain a lithium bisulfate roasted, lithium-containing material and/or a roasted lithium-containing material which can then be leached under conditions suitable to obtain a first aqueous composition comprising lithium sulfate and/or lithium bisulfate 16 such as a first aqueous composition comprising lithium sulfate. The first aqueous composition comprising lithium sulfate and/or lithium bisulfate 16 can then be purified 18, for example to remove at least a portion of a metal impurity or a non-metallic impurity (for example Si and derivatives thereof) that has leached into the first aqueous composition then submitted to an electromembrane process 20 (such as a two-compartment monopolar or bipolar membrane electrolysis process, a three-compartment monopolar or bipolar membrane electrolysis process, or a combination of a two-compartment monopolar or bipolar membrane electrolysis process and a three-compartment monopolar or bipolar membrane electrolysis process) under suitable conditions for at least partial conversion of the lithium sulfate and/or lithium bisulfate into lithium hydroxide 22 and to obtain a second aqueous composition comprising lithium sulfate and/or lithium bisulfate 24. The second aqueous composition comprising lithium sulfate and/or lithium bisulfate 24 can then be used as the aqueous composition comprising lithium bisulfate for mixing with the lithium-containing material 12 such as a lithium-containing ore such as β-spodumene to obtain the mixture. As it can be seen in FIG. 1, some extra $H_2SO_4$ can be added. For example, $H_2SO_4$ can be added to the second composition. For example, $H_2SO_4$ can be added just before carrying out acid roasting when using the second composition as a source of acid and lithium bisulfate.

For example, purification 18 can be carried out as described in PCT Application WO 2013/159194 entitled "Processes for preparing lithium hydroxide", the contents of which are incorporated by reference.

Figure 4:
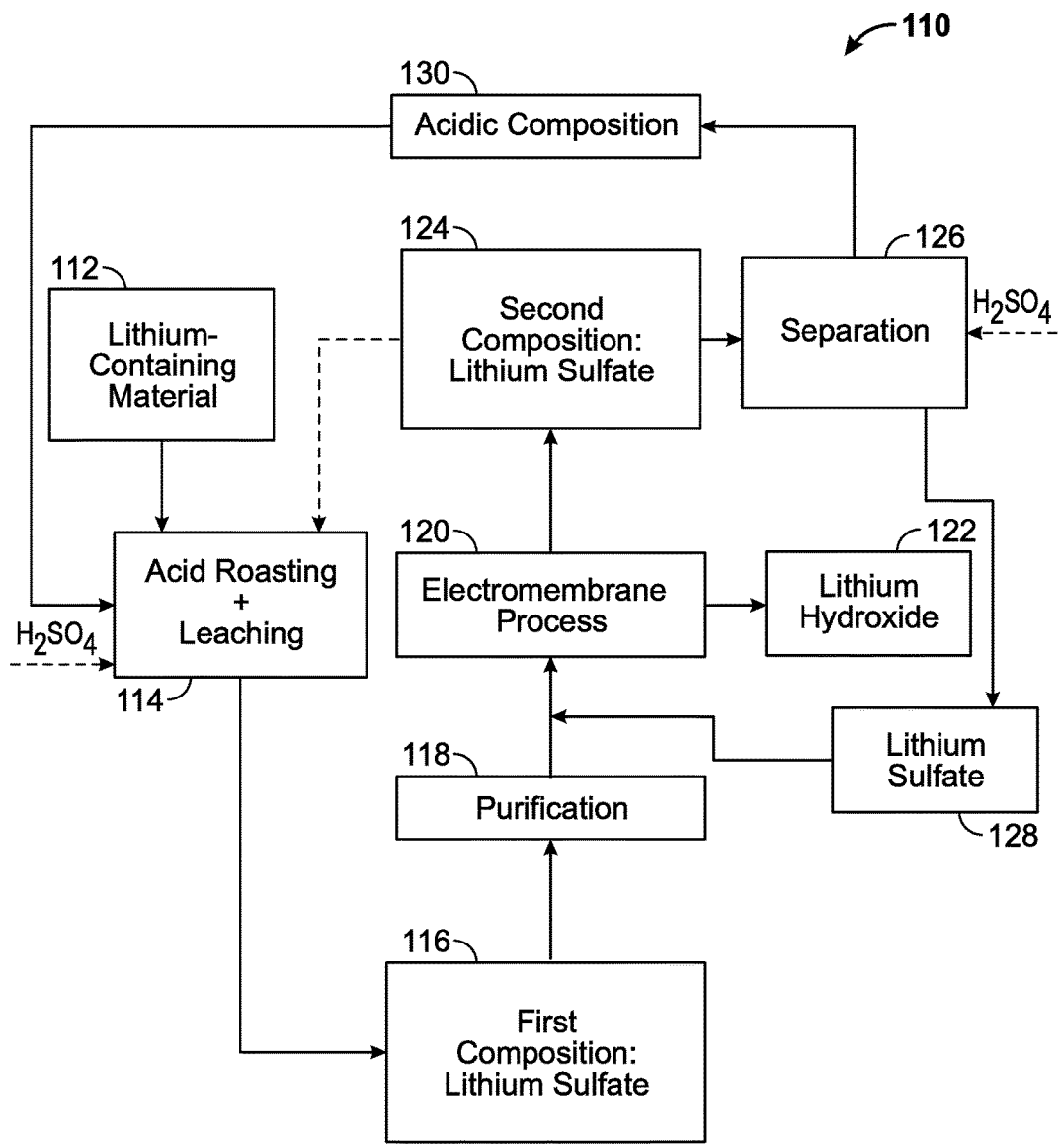
FIG. 4 is a schematic diagram of a method according to another embodiment of the present disclosure.

Another exemplary flow diagram for a method of the present disclosure is shown in FIG. 4. The method 110 exemplified therein is for preparing lithium hydroxide and is similar to the method 10 exemplified in FIG. 1. Several steps in the method of FIG. 4 (112, 114, 116, 118, 120, 122 and 124) are similar to those found in the method of FIG. 1 (12, 14, 16, 18, 20, 22 and 24). The content of the first composition (see 16 vs 116) and second composition (see 24 vs 124) can optionally vary slightly. For example, in step 116, the first composition obtained comprises lithium sulfate and optionally lithium bisulfate. Moreover, the second composition obtained in step 124 comprises lithium sulfate and optionally lithium bisulfate. With the exception of such particularities of the content of the first and second compositions and steps 126, 128 and 130 that do not have an equivalent in the method of FIG. 1, these two methods are quite similar. With respect to the separation step 126, such step was found to be an alternative instead of simply reusing the second composition into the acid roasting step 114 (see the dotted line between step 124 and 114). In separation step 126, water is removed in order to obtain a more concentrated acidic composition 130. It was found that such a more concentrated acidic composition that comprises sulfuric acid was efficient to carry out the acid roasting step in 114. The person skilled in the art would understand that various processes can be used in step 126 in order to remove water from the second composition. For example, the second composition can be heated, the second composition can be passed through a dehydration process through a membrane or column. The second composition can also be cooled down in order to favor the precipitation of lithium sulfate and then carry out a solid/liquid separation, thereby recovering lithium sulfate 128. The second composition can also be seeded with lithium sulfate to favor precipitation of lithium sulfate 128. Thus, there are various possible ways of achieving steps 126, 128 and 130. As it can be seen in FIG. 4, some extra $H_2SO_4$ can be added. For example, $H_2SO_4$ can be added just before or after carrying out the separation step 26. For example, $H_2SO_4$ can be added just before carrying out acid roasting 114 when using the acidic composition 130 as a source of acid.

For example, the second composition can be heated in separation step 126 at a temperature of about 100° C. to about 135° C. or about 100° C. to about 125° C. in order to remove water therefrom. That can be carried out by a distillation process that can be carried out under atmospheric pressure or under vacuum. It was observed that during such a process, it was possible to concentrate the sulfuric acid and obtain the acidic composition 130 that can eventually be used for the acidic roasting 114. Moreover, while heating the second composition, it was observed that a substantially selective precipitation of lithium sulfate monohydrate ($Li_2SO_4.H_2O$) was occurring. It was also noted that when maintaining temperature below about 125 or 130° C., formation of anhydrous lithium sulfate was avoided. Then, a solid/liquid separation was carried out and the precipitated lithium sulfate can be recovered in step 128, for example as ($Li_2SO_4.H_2O$). The latter was found to be more crystalline than anhydrous lithium sulfate. In fact, the monohydrate is easier to recover since being in a needle like shape of crystal and has less tendency to retain water and/or acid. It was significantly easier to carry out the solid-liquid separation step when the solid was lithium sulfate monohydrate (as compared to lithium sulfate anhydrous). The recovered lithium sulfate can thus be reused in electromembrane process 120.

The below presented examples are non-limitative and are used to better exemplify the methods of the present disclosure.

The present disclosure includes a method for extracting lithium from a lithium-containing material, the method comprising leaching a lithium bisulfate roasted, lithium-containing material under conditions suitable to obtain an aqueous composition comprising a lithium compound.

For example, the lithium bisulfate roasted, lithium-containing material can be prepared by a method comprising:
- mixing the lithium-containing material with an aqueous composition comprising lithium bisulfate and thereby obtaining a mixture; and
- roasting the mixture under suitable conditions to obtain the lithium bisulfate roasted, lithium-containing material.

The lithium bisulfate roasted, lithium-containing material can be prepared, for example using known means for roasting lithium-containing material. The selection of suitable conditions to obtain the lithium bisulfate roasted, lithium-containing material can be made by a person skilled in the art in light of their common general knowledge and with reference to the present disclosure. For example, processes comprising roasting a lithium-containing material with an acid are disclosed in PCT Application WO 2013/159194 entitled "Processes for preparing lithium hydroxide", the contents of which are incorporated by reference.

The roasted lithium-containing material can be prepared, for example using known means for roasting lithium-containing material. The selection of suitable conditions to obtain the roasted lithium-containing material can be made by a person skilled in the art in light of their common general knowledge and with reference to the present disclosure. For example, processes comprising roasting a lithium-containing material with an acid are disclosed in PCT Application WO 2013/159194 entitled "Processes for preparing lithium hydroxide", the contents of which are incorporated by reference.

For example, the molar ratio between the lithium bisulfate in the aqueous composition comprising lithium bisulfate and lithium in the lithium-containing material can be from about 0.1:1 to about 10:1, about 0.1:1 to about 4:1, about 0.2:1 to about 4:1 about 0.5:1 to about 4:1; about 1:1 to about 2:1 or about 1:1.

For example, the molar ratio between the lithium sulfate in the aqueous composition comprising lithium sulfate and lithium in the lithium-containing material can be from about 0.1:1 to about 10:1, about 0.1:1 to about 4:1, about 0.2:1 to about 4:1 about 0.5:1 to about 4:1; about 1:1 to about 2:1 or about 1:1.

For example, the aqueous composition comprising lithium bisulfate can further comprise an acid such as, for example sulfuric acid.

For example, the aqueous composition comprising lithium sulfate can further comprise an acid such as, for example sulfuric acid.

For example, the acid can be sulfuric acid.

For example, the molar ratio between the acid in the aqueous composition comprising lithium bisulfate and lithium in the lithium-containing material can be from about 0.5:1 to about 4:1, from about 1:1 to about 2:1 or from about 1.1:1 to about 1.25:1.

For example, the molar ratio between the acid in the aqueous composition comprising lithium sulfate and lithium in the lithium-containing material can be from about 0.5:1 to about 4:1, from about 1:1 to about 2:1 or from about 1.1:1 to about 1.25:1.

For example, the acid can be present in a stoichiometric excess of from about 1% to about 100%, based on the amount of lithium in the lithium-containing material.

For example, the acid can be present in a stoichiometric excess of from about 30% to about 100%, based on the amount of lithium in the lithium-containing material.

For example, the acid can be present in a stoichiometric excess of from about 20% to about 50%, based on the amount of lithium in the lithium-containing material.

For example, the acid can be present in a stoichiometric excess of from about 10% to about 50%, based on the amount of lithium in the lithium-containing material.

For example, the acid can be present in a stoichiometric excess of from about 20% to about 45%, based on the amount of lithium in the lithium-containing material.

For example, the acid can be present in a stoichiometric excess of from about 10% to about 30%, based on the amount of lithium in the lithium-containing material.

For example, the acid can be present in a stoichiometric excess of from about 55% to about 60%, based on the amount of lithium in the lithium-containing material.

For example, the first aqueous composition can comprise potassium and/or sodium.

For example, the second aqueous composition can comprise potassium and/or sodium.

For example, the second aqueous composition can comprise less $Li^+$ ions than $HSO_4^-$ ions.

For example, the second aqueous composition can comprise free $H_2SO_4$.

For example, the second aqueous composition can comprise free $H_2SO_4$ that was generated during the electromembrane process.

For example, the second composition can comprise lithium bisulfate and sulfuric acid.

For example, the second composition can comprise lithium sulfate and sulfuric acid.

For example, the second composition can comprise lithium bisulfate, lithium sulfate and sulfuric acid.

For example, the second composition can comprise sulfuric acid.

For example, the mixture can be roasted at a roasting temperature of from about 150° C. to about 400° C. For example, the mixture can be roasted at a roasting temperature of from about 200° C. to about 350° C., about 200° C. to about 325° C., about 200° C. to about 300° C., about 250° C. to about 350° C., or about 250° C. to about 300° C. For example, the mixture can be roasted at a roasting temperature of about 250° C. or about 300° C.

For example, the mixture can roasted for a time of about 1 minute to about 24 hours at the roasting temperature. For example, the mixture can be roasted for a time of about 1 minute to about 2 hours at the roasting temperature. For example, the mixture can be roasted for a time of about 15 minutes to about 2 hours at the roasting temperature. For example, the mixture can be roasted for a time of about 30 minutes at the roasting temperature.

For example, lithium sulfate monohydrate can be substantially selectively precipitated and/or substantially selectively formed from the second composition.

For example, lithium sulfate anhydrous can be substantially selectively precipitated and/or substantially selectively formed from the second composition.

For example, the method can further comprises recovering lithium sulfate from the second aqueous composition and reusing the lithium sulfate in the electromembrane process.

For example, the method can further comprise at least partially recovering lithium sulfate from the second aqueous composition, before using the second aqueous composition for reacting with the lithium-containing material, and reusing the lithium sulfate in the electromembrane process.

For example, the method can comprise increasing concentration of acid in the second aqueous composition by removing water from the second aqueous composition.

For example, increasing concentration of the acid can be carried out by heating the second aqueous composition.

For example, increasing concentration of the acid can be carried out by heating the aqueous composition.

For example, increasing concentration of the acid in the second aqueous composition can be carried out by adding some more concentrated acid or some acid having a higher concentration.

For example, increasing concentration of the acid in the second aqueous composition can be carried out by adding some more concentrated acid or some acid having a higher concentration.

For example, increasing concentration of the acid in the acidic composition can be carried out by adding some more concentrated acid or some acid having a higher concentration.

For example, the second aqueous composition can be heated at a temperature of about 100° C. to about 135° C., about 100° C. to about 300° C., about 100° C. to about 250° C., about 200° C. to about 250° C., about 105° C. to about 130° C., about 110° C. to about 130° C., about 115° C. to about 125° C., about 100° C. to about 125° C.

For example, the acidic composition can be heated at a temperature of about 100° C. to about 135° C., about 100° C. to about 300° C., about 100° C. to about 250° C., about 200° C. to about 250° C., about 105° C. to about 130° C., about 110° C. to about 130° C., about 115° C. to about 125° C., about 100° C. to about 125° C.

For example, water can be removed by heating the electromembrane process aqueous composition at a temperature as discussed above.

For example, the second aqueous composition can be heated at atmospheric pressure.

For example, the aqueous composition can be heated at atmospheric pressure.

For example, increasing concentration of the acid can be carried out by a membrane dehydration process.

For example, increasing concentration of the acid can be carried out by a reverse osmosis membrane process.

For example, wherein removing water from the aqueous composition can cause precipitation of lithium sulfate monohydrate.

For example, removing water from the aqueous composition can cause a substantially selective precipitation of lithium sulfate monohydrate.

For example, removing water from the aqueous composition can cause crystallization of lithium sulfate monohydrate.

For example, the method can comprise increasing concentration of acid in the aqueous composition by removing water from the aqueous composition, thereby substantially selectively precipitating lithium sulfate.

For example, wherein removing water from the second aqueous composition can cause precipitation of lithium sulfate monohydrate.

For example, removing water from the second aqueous composition can cause a substantially selective precipitation of lithium sulfate monohydrate.

For example, removing water from the second aqueous composition can cause crystallization of lithium sulfate monohydrate.

For example, the method can comprise increasing concentration of acid in the second aqueous composition by removing water from the second aqueous composition, thereby substantially selectively precipitating lithium sulfate.

For example, the method can further comprise carrying out a solid-liquid separation to recover the lithium sulfate, thereby obtaining the lithium sulfate and an acidic composition.

For example, the solid-liquid separation can be carried out at a temperature of about 5° C. to about 150° C., about 15° C. to about 130° C., about 20° C. to about 125° C., about 25° C. to about 125° C., about 20° C. to about 75° C., about 20° C. to about 50° C. or about 50° C. to about 100° C.

For example, the method can further comprises carrying out a solid-liquid separation to recover the lithium sulfate, thereby obtaining the lithium sulfate and an acidic aqueous effective to be used for being mixed with a lithium-containing material.

For example, the process comprises recovering lithium sulfate in the form of lithium sulfate monohydrate from the second aqueous composition and reusing the lithium sulfate for the electromembrane process.

For example, the acid can be $H_2SO_4$.

For example, the method can comprise carrying out a solid-liquid separation to recover the lithium sulfate, thereby obtaining the lithium sulfate and an acidic aqueous effective to be used for being mixed with a lithium-containing material.

For example, the method can further comprise reusing the obtained lithium sulfate in the electromembrane process.

For example, the second composition can be further treated in order to increase acid concentration. For example such treatment can be carried out by a dehydration membrane process, a reverse osmosis membrane process, heating or any known suitable method to increase acid concentration. For example, the acidic composition can be treated so as to remove at least 75, at least 80, at least 85, at least 90 or at least 95% of water.

For example, the acidic composition can be further treated in order to increase acid concentration. For example such treatment can be carried out by a dehydration membrane process, a reverse osmosis membrane process, heating or any known suitable method to increase acid concentration. For example, the acidic composition can be treated so as to remove at least 75, at least 80, at least 85, at least 90 or at least 95% of water.

For example, once the second composition is obtained, and before completing a cycle and carrying out once more an acid roasting, some fresh $H_2SO_4$ can be added.

For example, once the second composition is obtained, and before completing a cycle and carrying out once more an acid roasting, some fresh and concentrated $H_2SO_4$ can be added. For example, such concentrated $H_2SO_4$ can be about 90% to about 98%, about 93% to about 98%, or about 95% to about 98%.

For example, at least 70% by weight of the water contained in the second composition can be removed therefrom, and about 30 to about 80% by weight of lithium sulfate can be removed by crystallization from the second composition.

The lithium-containing material can vary and the selection of a suitable lithium-containing material can be made by a person skilled in the art. For example, the lithium-containing material can be a lithium-containing ore, a lithium-containing compound or a recycled industrial lithium-containing entity.

For example, the lithium-containing ore can comprise, consist essentially of or consist of α-spodumene, β-spodumene, lepidolite, pegmatite, petalite, eucryptite, amblygonite, hectorite, smectite, jadarite, a clay or a mixture thereof. For example, the lithium-containing ore can comprise, consist essentially of or consist of β-spodumene or jadarite. For example, the lithium-containing ore can comprise, consist essentially of or consist of β-spodumene.

For example, the lithium-containing compound can comprise, consist essentially of or consist of lithium chloride, lithium sulfate, lithium bicarbonate, lithium carbonate, lithium nitrate, lithium acetate, lithium fluoride, lithium stearate, lithium citrate or a mixture thereof.

For example, the recycled industrial lithium-containing entity can be lithium-containing batteries, other lithium products or derivatives thereof.

The conditions to obtain the aqueous composition comprising a lithium compound may vary and the selection of suitable conditions can be made by a person skilled in the art in light of their common general knowledge and with reference to the present disclosure. For example, processes comprising leaching an acid roasted lithium-containing material are disclosed in PCT Application WO 2013/159194 entitled "Processes for preparing lithium hydroxide", the contents of which are incorporated by reference.

For example, in the methods of the present disclosure, the lithium bisulfate roasted, lithium-containing material can be leached with water to obtain the aqueous composition comprising the lithium compound.

For example, the roasting and the leaching can be carried out in a single apparatus. For example, the roasting can be carried out in a first apparatus and the leaching can be carried out in a second apparatus. It will be appreciated by a person skilled in the art that using a first apparatus for roasting and a second apparatus for leaching may, for example, result in useful control of the concentration of the aqueous composition comprising a lithium compound. Mixing the lithium-containing material with the aqueous composition comprising lithium bisulfate can be carried out in the first apparatus or in another apparatus.

It will be appreciated by a person skilled in the art that impurities may be found in lithium-containing materials which may, for example, be leached under the conditions suitable to obtain the aqueous composition comprising a lithium compound in the method for extracting lithium from a lithium-containing material of the present disclosure. Accordingly, the method for extracting lithium from a lithium-containing material can further comprise purification of the aqueous composition comprising a lithium compound so-obtained from the method. The selection of suitable purification conditions can be made by a person skilled in the art in light of their common general knowledge and with reference to the present disclosure. For example, processes comprising the purification of an aqueous composition comprising a lithium compound are disclosed in PCT Application WO 2013/159194 entitled "Processes for preparing lithium hydroxide", the contents of which are incorporated by reference.

For example, in the methods for extracting lithium from a lithium-containing material of the present disclosure, the lithium-containing material can further comprise a leachable metal or non-metallic impurity and the aqueous composition comprising a lithium compound can be further treated under conditions suitable to remove at least a portion of the leachable metal impurity from the aqueous composition comprising a lithium compound. The term "leachable metal impurity" as used herein refers to a metal other than lithium which is present in the lithium-containing material and which can be co-leached along with the lithium under the conditions suitable to obtain the aqueous composition comprising a lithium compound in the methods of the present disclosure.

The term "leachable non-metallic impurity" as used herein refers to a non-metallic compound which is present in the lithium-containing material and which can be co-leached along with the lithium under the conditions suitable to obtain the aqueous composition comprising a lithium compound in the methods of the present disclosure.

For example, the leachable metal impurity can comprise aluminum, iron, magnesium, calcium, chromium, zinc, manganese or a mixture thereof which can, for example co-leach along with the lithium under the conditions suitable to obtain the aqueous composition comprising a lithium compound so as to obtain an aqueous composition further comprising a metal ion chosen from $Al^{3+}$, $Fe^{2+}$, $Fe^{3+}$, $Mg^{2+}$, $Ca^{2+}$, $Cr^{2+}$, $Cr^{3+}$, $Cr^{6+}$, $Mn^{2+}$ and a mixture thereof.

For example, the term "leachable non-metallic impurity" can comprise metalloid such as silicium or silicon dioxide.

For example, the aqueous composition comprising a lithium compound can be an aqueous composition comprising lithium sulfate and/or lithium bisulfate. For example, the aqueous composition comprising a lithium compound can be an aqueous composition comprising lithium sulfate.

For example, the molar ratio between the lithium sulfate and the lithium bisulfate in the aqueous composition comprising lithium sulfate and/or lithium bisulfate can be at least about 9:1.

For example, the molar ratio between the lithium sulfate and the lithium bisulfate in the aqueous composition comprising lithium sulfate and/or lithium bisulfate can be at least about 19:1.

For example, the molar ratio between the lithium sulfate and the lithium bisulfate in the aqueous composition comprising lithium sulfate and/or lithium bisulfate can be at least about 99:1.

The present disclosure further includes a method for preparing lithium hydroxide, the method comprising:

obtaining a first aqueous composition comprising lithium sulfate and/or lithium bisulfate by a method for extracting lithium from a lithium-containing material according to a method of the present disclosure; and submitting the first aqueous composition comprising lithium sulfate and/or lithium bisulfate to an electromembrane process under suitable conditions for at least partial conversion of the lithium sulfate and/or lithium bisulfate into lithium hydroxide.

The conditions for at least partial conversion of the lithium sulfate and/or lithium bisulfate into lithium hydroxide may vary, and the selection of suitable conditions can be made by a person skilled in the art in light of their common general knowledge and with reference to the present disclosure. For example, processes for preparing lithium hydroxide comprising submitting a composition comprising a lithium compound to an electromembrane process are disclosed in PCT Application WO 2014/138933 entitled "Processes for preparing lithium hydroxide"; International Patent Application No. PCT/CA2014/000769 filed on Oct. 23, 2014 entitled "Processes and systems for preparing lithium hydroxide"; and PCT Application WO 2013/159194 entitled "Processes for preparing lithium hydroxide", the contents of each of which are incorporated by reference.

For example, during the electromembrane process, pH of the lithium sulfate and/or lithium bisulfate composition can be acidic. The selection of suitable acidic conditions can be made by a person skilled in the art in light of their common general knowledge and with reference to the present disclosure. For example, processes for preparing lithium hydroxide comprising submitting a composition comprising a lithium compound to an electromembrane process under acidic conditions are disclosed in PCT Application WO 2014/138933 entitled "Processes for preparing lithium hydroxide" and International Patent Application No. PCT/CA2014/000769 filed on Oct. 23, 2014 entitled "Processes and systems for preparing lithium hydroxide", the contents of each of which are incorporated by reference.

For example, the electromembrane process can comprise a three-compartment monopolar or bipolar membrane electrolysis process and during the three-compartment monopolar or bipolar membrane electrolysis process, the pH can be at least substantially maintained at a value of about 2 to about 4.

For example, the electromembrane process can comprise a three-compartment monopolar or bipolar membrane electrolysis process and during the three-compartment monopolar or bipolar membrane electrolysis process, the pH can be at least substantially maintained at a value of about 2 or of about 1.

For example, the electromembrane process can comprise a two-compartment monopolar or bipolar membrane electrolysis process, and conversion of the lithium sulfate and/or lithium bisulfate to lithium hydroxide can proceed until the pH of the lithium sulfate and/or lithium bisulfate composition has a value of from about 0.1 to about 2.0, about 0.2 to about 1.5, or about 0.4 to about 1.0.

For example, the electromembrane process can comprise a two-compartment monopolar or bipolar membrane electrolysis process, and conversion of the lithium sulfate and/or lithium bisulfate to lithium hydroxide can proceed until the pH of the lithium sulfate and/or lithium bisulfate composition has a value of from about 0.5 to about 0.7.

For example, during the electromembrane process, pH of the lithium sulfate and/or lithium bisulfate composition can be basic. The selection of suitable basic conditions can be made by a person skilled in the art in light of their common general knowledge and with reference to the present disclosure. For example, processes for preparing lithium hydroxide comprising submitting a composition comprising a lithium compound to an electromembrane process under basic conditions are disclosed in PCT Application WO 2013/159194 entitled "Processes for preparing lithium hydroxide", the contents of which are incorporated by reference.

For example, the electromembrane process can comprise a three-compartment monopolar or bipolar membrane electrolysis process and during the three-compartment monopolar or bipolar membrane electrolysis process, the pH of the feed composition can be at least at a value of about 10 to about 12.

For example, the electromembrane process can comprise a three-compartment monopolar or bipolar membrane electrolysis process and during the three-compartment monopolar or bipolar membrane electrolysis process, the pH can be at least substantially maintained at a value of about 10 to about 12.

For example, the electromembrane process can comprise a three-compartment monopolar or bipolar membrane electrolysis process and during the three-compartment monopolar or bipolar membrane electrolysis process, the pH can be at least substantially maintained at a value of about 10.5 to about 12.5.

For example, the electromembrane process can comprise a three-compartment monopolar or bipolar membrane electrolysis process and during the three-compartment monopolar or bipolar membrane electrolysis process, the pH can be at least substantially maintained at a value of about 11 to about 12.

For example, the electromembrane process can comprise a two-compartment monopolar or bipolar membrane electrolysis process; a three-compartment monopolar or bipolar membrane electrolysis process; or a combination of a two-compartment monopolar or bipolar membrane electrolysis process and a three-compartment monopolar or bipolar membrane electrolysis process. For example, the electromembrane process can comprise a two-compartment monopolar or bipolar membrane electrolysis process. For example, the electromembrane process can comprise a three-compartment monopolar or bipolar membrane electrolysis process. For example, the electromembrane process can comprise a combination of a two-compartment monopolar or bipolar membrane electrolysis process and a three-compartment monopolar or bipolar membrane electrolysis process. The selection of a suitable electromembrane process can be made by a person skilled in the art in light of their common general knowledge and with reference to the present disclosure.

For example, processes for preparing lithium hydroxide comprising submitting a composition comprising a lithium compound to a three-compartment monopolar or bipolar membrane electrolysis process are disclosed in PCT Application WO 2014/138933 entitled "Processes for preparing lithium hydroxide" and PCT Application WO 2013/159194 entitled "Processes for preparing lithium hydroxide", the contents of each of which are incorporated by reference.

For example, processes for preparing lithium hydroxide comprising submitting a composition comprising a lithium compound to a combination of a two-compartment monopolar or bipolar membrane electrolysis process and a three-compartment monopolar or bipolar membrane electrolysis process are disclosed in International Patent Application No. PCT/CA2014/000769 filed on Oct. 23, 2014 entitled "Processes and systems for preparing lithium hydroxide", the contents of which are incorporated by reference.

Accordingly, the present application also includes a method for preparing lithium hydroxide further comprising:

submitting the first aqueous composition comprising lithium sulfate and/or lithium bisulfate to an electromembrane process such as a two compartment monopolar or bipolar membrane electrolysis process under suitable conditions to obtain a second aqueous composition comprising lithium sulfate and/or lithium bisulfate; and using the second aqueous composition comprising lithium sulfate and/or lithium bisulfate as the aqueous composition comprising lithium bisulfate in a method for preparing lithium bisulfate roasted, lithium-containing material of the present application.

For example, the molar ratio between the lithium bisulfate and the lithium sulfate in the second aqueous composition comprising lithium sulfate and/or lithium bisulfate can be at least about 3:2.

For example, the molar ratio between the lithium bisulfate and the lithium sulfate in the second aqueous composition comprising lithium sulfate and/or lithium bisulfate can be at least about 9:1.

For example, the molar ratio between the lithium bisulfate and the lithium sulfate in the second aqueous composition comprising lithium sulfate and/or lithium bisulfate can be at least about 19:1.

For example, the molar ratio between the lithium bisulfate and the lithium sulfate in the second aqueous composition comprising lithium sulfate and/or lithium bisulfate can be at least about 99:1.

For example, the molar ratio between the lithium bisulfate and the lithium sulfate in the second aqueous composition comprising lithium sulfate and/or lithium bisulfate can be from about 3:2 to about 99:1.

For example, the molar ratio between the lithium bisulfate and the lithium sulfate in the second aqueous composition comprising lithium sulfate and/or lithium bisulfate can be from about 3:2 to about 19:1.

For example, the second aqueous composition comprising lithium sulfate and/or lithium bisulfate can comprise lithium bisulfate and the method can further comprise adding a base to a portion of the second aqueous composition comprising lithium sulfate and/or lithium bisulfate under conditions suitable to convert at least a portion of the lithium bisulfate to lithium sulfate. It will be appreciated by a person skilled in the art that bleeding a portion of the second aqueous composition comprising lithium bisulfate and optionally lithium sulfate from the circulation of a method of the present disclosure and adding a base to convert at least a portion of the lithium bisulfate to lithium sulfate may, for example allow for re-equilibration of stock if excess lithium bisulfate is present in the method. The selection of suitable conditions for converting the at least a portion of the lithium bisulfate to lithium sulfate can be made by a person skilled in the art. For example, the base can comprise calcium hydroxide, calcium oxide and/or calcium carbonate.

For example, in the methods of the present disclosure, calcium sulfate can also be obtained. For example, lithium bisulfate can be converted into a calcium sulfate precipitate, that can eventually be purified by means of a filtration.

For example, the electromembrane process can comprise a two-compartment monopolar or bipolar membrane electrolysis process and during the two-compartment monopolar or bipolar membrane electrolysis process voltage can be at least substantially maintained at a value of about 4 V to about 5 V, about 3 V to about 6 V about 2 V to about 8 V, about 2.5 V to about 4 V.

For example, the electromembrane process can comprise a two-compartment monopolar or bipolar membrane electrolysis process and during the two-compartment monopolar or bipolar membrane electrolysis process voltage can be at least substantially maintained at a value of about 4.5 V.

For example, the electromembrane process can comprise a two-compartment monopolar or bipolar membrane electrolysis process and during the two-compartment monopolar or bipolar membrane electrolysis process LiOH current efficiency can be at least substantially maintained at a value of about 30 to about 50%, about 30 to about 40%, 50% to about 95%, about 55% to about 90% or about 65% to about 85%.

For example, the electromembrane process can comprise a two-compartment monopolar or bipolar membrane electrolysis process and during the two-compartment monopolar or bipolar membrane electrolysis process LiOH current efficiency can be at least substantially maintained at a value of about 75%.

For example, lithium concentration in the first aqueous composition comprising lithium sulfate and/or lithium bisulfate can be at least substantially maintained at a value of from about 20 g lithium per liter solution to about 40 g lithium per liter of solution, of from about 10 g lithium per liter solution to about 20 g lithium per liter of solution, of from about 5 g lithium per liter solution to about 40 g lithium per liter of solution, or of from about 12 g lithium per liter solution to about 18 g lithium per liter of solution.

For example, lithium concentration in the first aqueous composition comprising lithium sulfate and/or lithium bisulfate can be at least substantially maintained at a value of from about 30 g lithium per liter solution to about 33 g lithium per liter of solution.

For example, lithium concentration in the second aqueous composition comprising lithium sulfate and/or lithium bisulfate can be at least substantially maintained at a value of from about 10 g lithium per liter solution to about 20 g lithium per liter of solution or from about 20 g lithium per liter solution to about 40 g lithium per liter of solution.

For example, lithium concentration in the second aqueous composition comprising lithium sulfate and/or lithium bisulfate can be at least substantially maintained at a value of from about 30 g lithium per liter solution to about 33 g lithium per liter of solution.

For example, the electromembrane process can comprise a two-compartment monopolar or bipolar membrane electrolysis process and during the two-compartment monopolar or bipolar membrane electrolysis process the lithium hydroxide can be produced in an aqueous solution that is at least substantially maintained at a concentration of lithium hydroxide of about 2 M to about 7 M, of about 2 M to about 4 M, of about 1.5 M to about 4.5 M, of about 1.5 M to about 7.5 M or of about 2.5 M to about 3.5 M.

For example, the electromembrane process can comprise a two-compartment monopolar or bipolar membrane electrolysis process and during the two-compartment monopolar or bipolar membrane electrolysis process the lithium hydroxide can be produced in an aqueous solution that is at least substantially maintained at a concentration of lithium hydroxide of about 3.0 M.

For example, the electromembrane process can comprise a two-compartment monopolar or bipolar membrane electrolysis process and during the two-compartment monopolar or bipolar membrane electrolysis process the lithium hydroxide can be produced in an aqueous solution that is at least substantially maintained at a temperature of about 40° C. to about 100° C. or about 60° C. to about 100° C. or of about 75° C. to about 95° C.

For example, the electromembrane process can comprise a two-compartment monopolar or bipolar membrane electrolysis process and during the two-compartment monopolar or bipolar membrane electrolysis process the lithium hydroxide can be produced in an aqueous solution that is at least substantially maintained at a temperature of about 80° C.

The methods of the present disclosure can be operated, for example as a batch method. Alternatively, the methods of the present disclosure can be operated as a semi-continuous method or a continuous method.

For example, the first aqueous composition comprising lithium sulfate and/or lithium bisulfate can be submitted to a two-compartment monopolar or bipolar membrane electrolysis process under suitable conditions to obtain the second aqueous composition comprising lithium sulfate and/or lithium bisulfate; the second aqueous composition comprising lithium sulfate and/or lithium bisulfate can then, for example, be used in a method for preparing lithium bisulfate roasted, lithium-containing material of the present application; the lithium bisulfate roasted, lithium-containing material so prepared can then be used, for example, in a method for extracting lithium from a lithium-containing material of the present application to obtain a third aqueous composition comprising lithium sulfate and/or lithium bisulfate which can be submitted to an electromembrane process; etc. so as to be operated, for example, as a semi-continuous method or a continuous method.

For example, the method can comprise submitting the first aqueous composition comprising lithium sulfate and/or lithium bisulfate to an electromembrane process under suitable conditions for partial conversion of the lithium sulfate and/or lithium bisulfate into lithium hydroxide at a conversion of about 30 to about 70%, of about 30 to about 60%, about 40 to about 55%, about 45 to about 55%, about 40 to about 50% or about 45 to about 60% and to obtain a second aqueous composition comprising lithium sulfate and/or lithium bisulfate; and using the second aqueous composition comprising lithium sulfate and/or lithium bisulfate as the aqueous composition comprising lithium bisulfate for mixing with the lithium-containing material and to obtain the mixture.

Without wishing to be bound by such a theory, the Applicant considers that lithium bisulfate, for example, when present in a composition of the present disclosure, can act as a buffer during an electromembrane process, thereby helping for the preparation of lithium hydroxide. For example, such a buffer allows for increasing current efficiency when preparing lithium hydroxide.

EXAMPLES

Example 1

Sodium Bisulfate Roasting Tests

Seven β-spodumene bisulfate roasting tests and one standard acid roasting test were performed. Objectives of the tests included to ensure that the spodumene phase transition occurred during baking at 1050° C.; to collect test data for comparison with bisulfate roasting results; and to study the effect of the temperature and/or $NaHSO_4$ concentration on the bisulfate baking test results.

The reaction pulp for sulfatation was prepared by mixing β-spodumene with a 30, 50 or 100% excess of the desired sulfate agent over the stoichiometric requirement to the lithium amount in the β-spodumene.

The acidic mixture was then baked in a muffle furnace under standard conditions using a furnace temperature of 250° C. or 300° C. for a baking time at the target temperature of 30 minutes and a total baking time of 1.5-2 hours. The roasted β-spodumene was then subjected to a water leach to determine the extent of Li conversion. The bisulfate and acid roasting test results for trials using various parameters are summarized in Table 1.

TABLE 1

| Test | Sulfate Reagent | Stoichiometric Excess, % | Sulfate Roasting Temp., ° C. | Solution Temp., ° C. | Solids Temp., ° C. | Li in PLS (Water leach), mg/L | % Lithium Extraction |
|---|---|---|---|---|---|---|---|
| Acid roasting | $H_2SO_4$ | 30 | 250 | Ambient | Ambient | 21600 | 96.6 |
| Bisulfate roasting test T1 | $NaHSO_4$ | 30 | 250 | Ambient | Ambient | 13100 | 77.1 |
| Bisulfate roasting test T2 | $NaHSO_4$ | 30 | 250 | 70 | Ambient | 14500 | 85.1 |
| Bisulfate roasting test T3 | $NaHSO_4$ | 50 | 250 | 70 | Ambient | 13800 | 85.3 |
| Bisulfate roasting test T4 | $NaHSO_4$ | 50 | 300 | 70 | Ambient | 13500 | 82.4 |
| Bisulfate roasting test T5 | $NaHSO_4$ | 30 | 300 | 70 | 130 | 15400 | 83.4 |
| Bisulfate roasting test T6 | $NaHSO_4$ | 100 | 250 | 70 | 130 | 13200 | 94.3 |
| Bisulfate roasting test T7 | $NaHSO_4 + H_2SO_4$[1] | 30 | 250 | 70 | 130 | 14500 | 97.4 |

[1]Sodium bisulfate was added at an excess of 30% and sulphuric acid was added at a 30% excess to the bisulfate solution before roasting.

It was observed that when concentrating and/or removing water from the second composition (after the electromembrane process), it was possible to substantially selectively precipitate lithium sulfate (in the form of lithium sulfate monohydrate) and it was also possible to separate at least a portion of lithium sulfate from the acid (sulfuric acid). Alternatively, it is possible to substantially selectively precipitate lithium sulfate anhydrous.

It will be appreciated by a person skilled in the art that one or more parameters of the methods of the present disclosure such as but not limited to pH, temperature, current density, voltage, current efficiency and concentration can be monitored, for example by means known in the art. The selection of a suitable means for monitoring a particular parameter in a method of the present disclosure can be made by a person skilled in the art. Such parameters can also be maintained and/or changed by a person skilled in the art, for example in light of their common general knowledge and with reference to the present disclosure.

In table 1, sodium bisulfate was used as reagent to better distinguish between the alkali added as reagent and the lithium extracted from the B-spodumene and converted into lithium and sodium sulfate mixture.

The water leach tests of the bisulfate and acid roasting tests reported in Table 1 showed that the highest Li % extraction of 97.4% was achieved in bisulfate roasting test T7 when a mixture of sulphuric acid and sodium bisulfate solution was used as the sulfate reagent in the roasting process.

A 94.3% Li extraction in bisulfate roasting test T6 was achieved using bisulfate as the sole sulfate reagent in 100% stoichiometric excess.

Example 2

Lithium Bisulfate/Sodium Bisulfate Roasting Tests

Studies were carried out using a mixture of $LiHSO_4$, $NaHSO_4$ and $H_2SO_4$ as a sulfate reagent using the procedure described in Example 1. The acidic mixture was then baked in a muffle furnace under standard conditions using a solution at 70° C., a furnace temperature of 250° C. to 300° C. for a baking time at the target temperature of 30 to 60 minutes and a total baking time of 1.5-2.5 hours. The roasted β-spodumene was then subjected to a water leach to determine the extent of Li conversion. The bisulfate tests results for trials using various parameters are summarized in Table 2.

$kA/m^2$ and $5 kA/m^2$. These results for $4 kA/m^2$ are probably due to a technical failure during the tests. However, as it can be seen in FIG. 3 (further tests done with the same parameters than in FIG. 2) of the present disclosure, the results for $4 kA/m^2$ seems to be in accordance with those of $3 kA/m^2$ and $5 kA/m^2$. Based on those results shown in FIGS. 2 and 3 of the present disclosure, it can be one embodiment of the

TABLE 2[1]

| Test | Sulfate Reagent | Stoichiometric Excess, % | Baking Time (min) | Sulfate Roasting Temp., ° C. | Li in PLS (Water leach), mg/L | % Lithium Extraction |
|---|---|---|---|---|---|---|
| Bisulfate roasting test T8 | LiHSO$_4$ + NaHSO$_4$ | 0% H$_2$SO$_4$ | 30 | 250 | 33100 | 67.9 |
| Bisulfate roasting test T9 | LiHSO$_4$ + NaHSO$_4$ | 5% H$_2$SO$_4$ | 30 | 250 | 32100 | 70.5 |
| Bisulfate roasting test T10 | LiHSO$_4$ + NaHSO$_4$ | 10% H$_2$SO$_4$ | 30 | 250 | 33600 | 74.3 |
| Bisulfate roasting test T11 | LiHSO$_4$ + NaHSO$_4$ | 15% H$_2$SO$_4$ | 30 | 250 | 32500 | 77.0 |
| Bisulfate roasting test T12 | LiHSO$_4$ + NaHSO$_4$ | 20% H$_2$SO$_4$ | 30 | 250 | 34200 | 79.4 |
| Bisulfate roasting test T13 | LiHSO$_4$ + NaHSO$_4$ | 25% H$_2$SO$_4$ | 30 | 250 | 35400 | 81.6 |
| Bisulfate roasting test T14 | LiHSO4 + NaHSO4 | 30% H2SO4 | 30 | 250 | 33200 | 82.8 |
| Bisulfate roasting test T15 | LiHSO4 + NaHSO4 | 30% H2SO4 | 60 | 250 | 37500 | 85.2 |
| Bisulfate roasting test T16 | LiHSO4 + NaHSO4 | 30% H2SO4 | 30 | 275 | 33600 | 84.5 |
| Bisulfate roasting test T17 | LiHSO4 + NaHSO4 | 30% H2SO4 | 30 | 300 | 32800 | 88.1 |
| Bisulfate roasting test T18 | LiHSO4 + NaHSO4 | 30% H2SO4 | 60 | 300 | 36000 | 85.7 |
| Bisulfate roasting test T19 | LiHSO4 + NaHSO4 | 40% H2SO4 | 30 | 250 | 31800 | 87.3 |
| Bisulfate roasting test T20 | LiHSO4 + NaHSO4 | 50% H2SO4 | 30 | 250 | 33800 | 93.7 |
| Bisulfate roasting test T21 | LiHSO4 + NaHSO4 | 55% H2SO4 | 30 | 250 | 32500 | 90.9 |
| Bisulfate roasting test T22 | LiHSO4 + NaHSO4 | 60% H2SO4 | 30 | 250 | 30400 | 94.3 |

[1]A mixture of LiHSO$_4$ (85%) and NaHSO$_4$ (15%) at a 1:1 ratio to Li in the ore was used. Sulphuric acid was then added in a stoichiometric excess as indicated.

The extraction values in Table 2 are calculated based on the Li content in the water leach residue and the initial feed. It is clear from the above results that Li extraction increased with the amount of acid used. In table 2, sodium bisulfate was added to lithium bisulfate at 15% mass ratio in order to simulate the first composition that would be obtained during the alkali extraction from a typical beta-spodumene concentrate obtained from alpha-spodumene ore extraction.

Example 3

Figure 2:
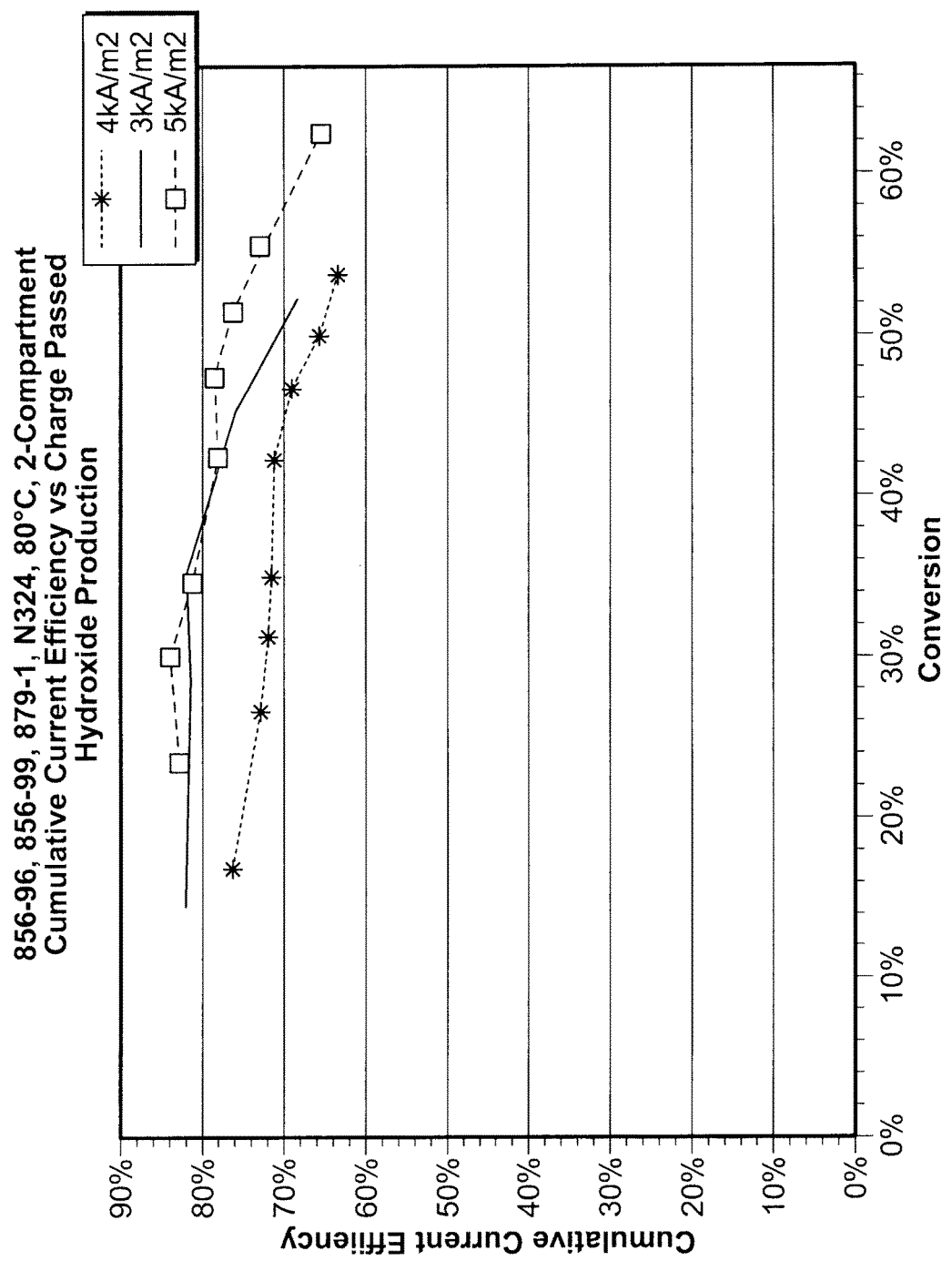
FIGS. 2 and 3 are plots of cumulative current efficiency as a function of charges passed for alkali hydroxide production.
Figure 3:
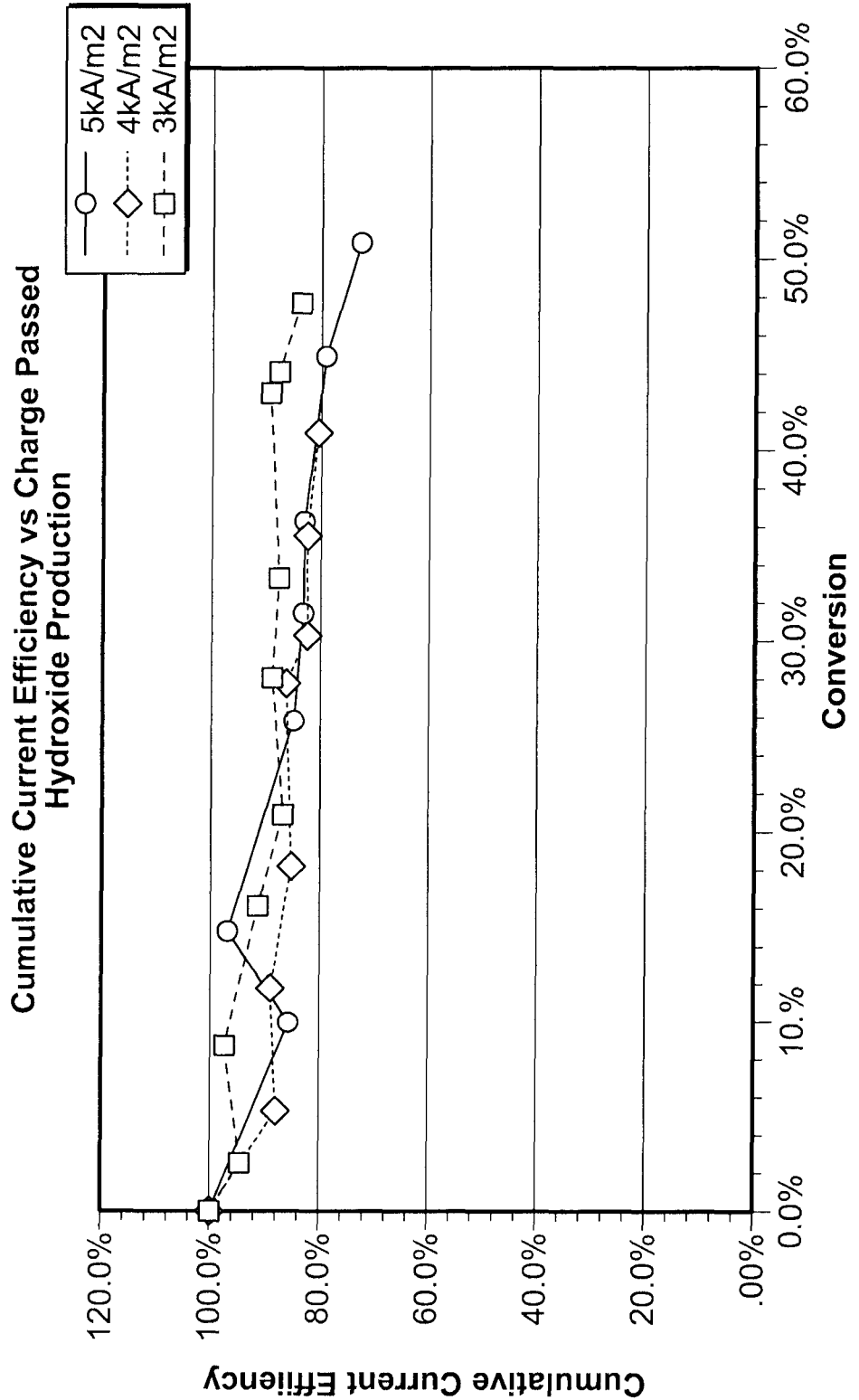

Cumulative Current Efficiency vs Charge Passed Conversion of First Composition into Alkali Hydroxide Production Tests Some tests have been made and are described in PCT/CA2014/000769 (hereby incorporated by reference in its entirety) regarding the use of a two-compartment membrane electrolysis cell for producing LiOH. The tests shown in PCT/CA2014/000769 at FIGS. 3A-D; FIGS. 4A-D; and FIGS. 5A-D have been cumulated and are shown in FIG. 2 of the present disclosure. Thus, the parameters of the tests shown in FIGS. 2 and 3 of the present disclosure are identical to the tests made in PCT/CA2014/000769. In FIG. 2 of the present disclosure, it can be seen that the results for $4 kA/m^2$ are lower than expected (in terms of current efficiency) when compared to the results obtained for 3 present disclosure to carry out the conversion of lithium sulfate into lithium hydroxide at a conversion of about 30 to about 60%, about 40 to about 60%, about 40 to about 50%, about 40 to about 55%, or about 45 to about 55% and then use the remaining composition (second aqueous composition) comprising lithium bisulfate as the aqueous composition comprising lithium bisulfate for mixing with the lithium-containing material and to obtain the mixture to be roasted.

Example 4

Lithium Bisulfate/Sodium Bisulfate Roasting Tests with Electrochemically Generated Sulfuric Acid Hydrogen Cations Studies were carried out using a mixture of LiHSO$_4$, NaHSO$_4$ and H$_2$SO$_4$ as a sulfate reagent using the procedure described in Example 1. The acidic mixture was then baked in a muffle furnace under standard conditions using a furnace temperature of 250° C. for a baking time at the target temperature of 30 minutes and a total baking time of 1.5-2.75 hours. The roasted β-spodumene was then subjected to a water leach to determine the extent of Li conversion. The bisulfate tests results for trials using various parameters are summarized in Table 3.

TABLE 3

| Test | Sulfate Reagent [1] | Stoichiometric Excess, % | Li in PLS (Water leach), mg/L | % Lithium Extraction |
|---|---|---|---|---|
| Bisulfate roasting test T23 | LiHSO4 + NaHSO4 + H2SO4 | 0% H2SO4 | 27100 | 66.4 |
| Bisulfate roasting test T24 | LiHSO4 + NaHSO4 + H2SO4 | 10% H2SO4 | 27100 | 75.1 |
| Bisulfate roasting test T25 | LiHSO4 + NaHSO4 + H2SO4 | 20% H2SO4 | 28800 | 82.0 |
| Bisulfate roasting test T26 | LiHSO4 + NaHSO4 + H2SO4 | 30% H2SO4 | 29000 | 85.8 |
| Bisulfate roasting test T27 | LiHSO4 + NaHSO4 + H2SO4 | 40% H2SO4 | 29800 | 89.2 |
| Bisulfate roasting test T28 | LiHSO4 + NaHSO4 + H2SO4 | 50% H2SO4 | 30900 | 95.6 |

[1] A mixture of 80% bisulfate (LiHSO$_4$ (85%) and NaHSO$_4$ (15%)) and 20% hydrogen cation from sulfuric acid on a molar basis was used at a 1:1 ratio to Li in the ore. This mixture is simulating the second composition that would be obtained from the electromembrane process with a conversion of lithium sulfate into lithium hydroxide of about 60%. Sulphuric acid was then added in a stoichiometric excess as indicated.

The extraction values in Table 3 are calculated based on the Li content in the water leach residue and the initial feed. It is clear from the above results that compared to Li extraction results obtained in Example 2, sulfuric acid generated electrochemically is proportionally reducing the required sulfuric acid excess.

Example 5

Removing Water and Lithium Sulfate from Process Solution

Following the roasting tests campaign based on various acidic mixtures simulating the second composition that would be obtained from the electromembrane process, further testing was made in order to remove as much water as possible from the aforementioned composition before mixing with the lithium-containing material.

Figure 5:
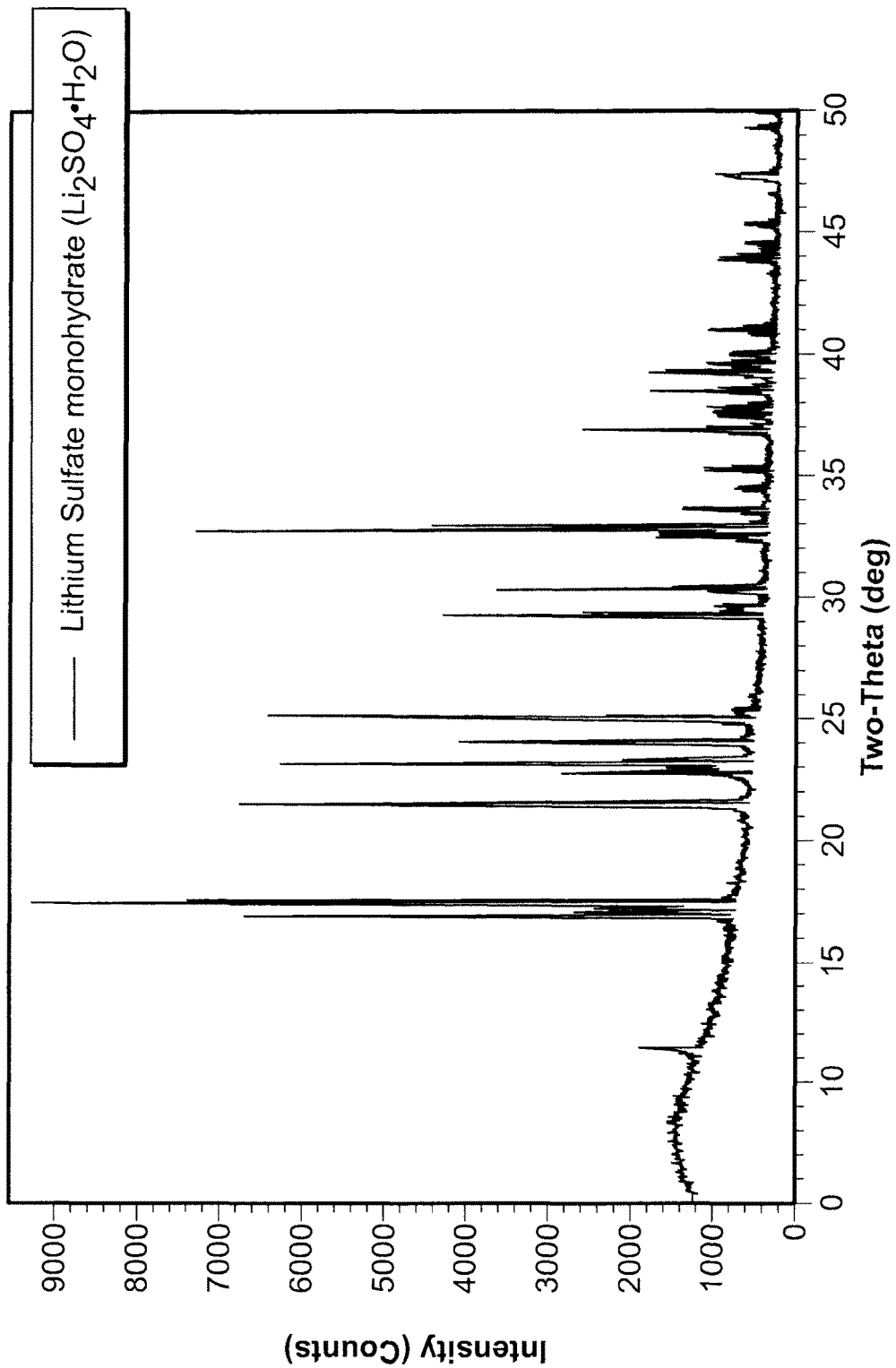
FIGS. 5 and 6 are XRD analysis of precipitated crystals recovered from separation step.
Figure 6:
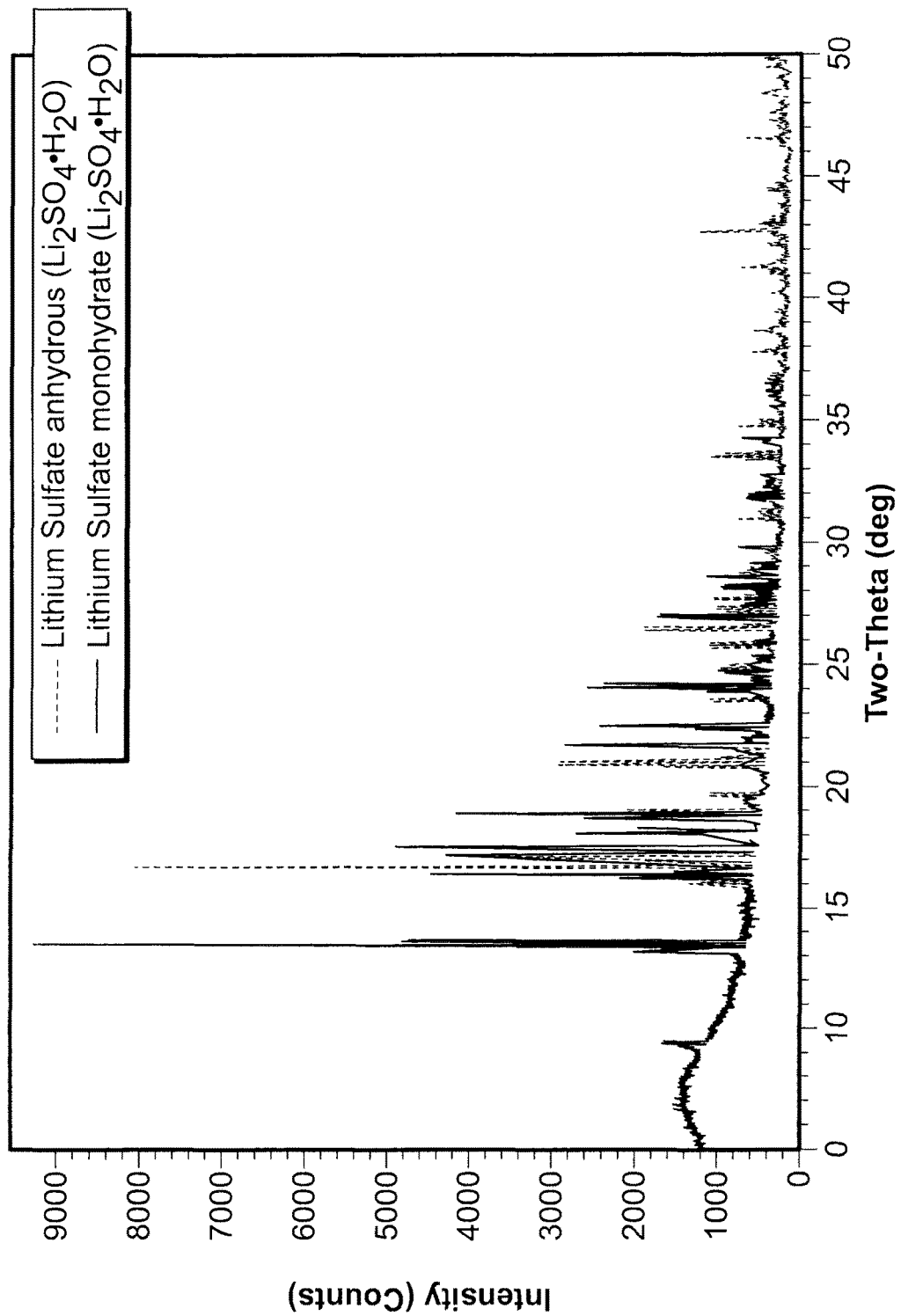

When heating the mixture, water is selectively removed by evaporation. When the mixture from which water was removed reaches a boiling temperature of about 118° C., it was observed that a precipitate forms. FIGS. 5 and 6 are XRD analysis of the precipitated crystals recovered from this process. FIG. 5 is resulting from an analysis of the precipitate recovered from test 07A. FIG. 5 shows that when precipitate forms at a temperature below about 125° C. to 130° C., its chemical composition is essentially lithium sulfate monohydrate. Thus, lithium sulfate monohydrate is substantially selectively precipitated and/or substantially selectively formed. FIG. 6 is resulting from an analysis of the precipitate recovered from test 04. It shows that when precipitation is carried out at temperatures of at least about 125° C. to 130° C., at least a portion of the precipitate is dehydrated, thereby forming lithium sulfate anhydrous. Continuing such heating can lead to substantially precipitating and/or forming lithium sulfate anhydrous.

Figure 7:
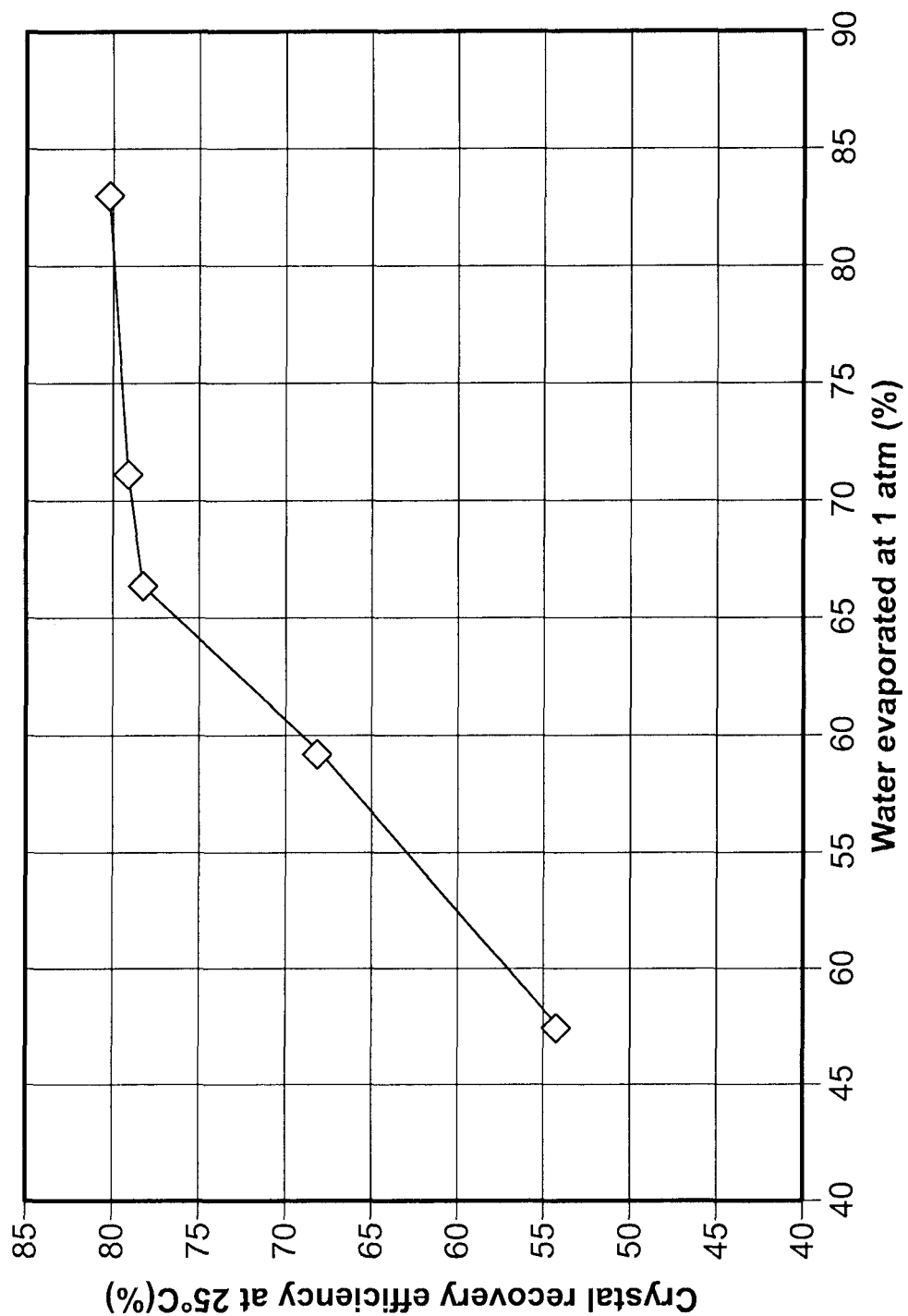
FIG. 7 is a plot of lithium sulfate recovery efficiency at the separation step as a function of water removed at atmospheric pressure on a mass basis.

It was also observed that, contrarily to the expected behavior of substantially pure lithium sulfate in aqueous solution, when the concentrated acidic mixture is cooled, the recovery of lithium sulfate monohydrate is increased dramatically. As shown in Tables 5 and 6, presenting data generated by two independent laboratories, about 35% to about 80% of the lithium sulfate can be separated as lithium sulfate monohydrate, for example, depending on the temperature at which the solution is cooled. FIG. 7, based on data in Table 5, shows lithium sulfate recovery efficiency at the separation step as a function of water removed at atmospheric pressure on a mass basis. It is apparent from this figure and from the final boiling temperatures in Table 5 that most of the lithium sulfate precipitates at a temperature below 130° C. in its monohydrate form.

It appears that this phenomenon, unanticipated from the very sparse literature about acidic lithium sulfate aqueous solutions, represent an operational advantage in the context of the present disclosure. Indeed, it can be recycled directly to the electromembrane process which benefit from this very high purity or substantially pure raw material addition to the main stream coming from the lithium-containing material.

From these tests, it was determined that the second composition resulting from test 07A (composition A) should be tested for the roasting of lithium containing material.

Based on this composition, a second evaporation step was tested (07B) in order to remove more water. Test 07A was further evaporated until reaching a boiling temperature of about 200° C. (composition B).

TABLE 5

| Test | Initial volume (mL) | Condensate (mL) | Filtration temperature (° C.) | Recovered crystal after rinsing (g) | Final boiling temperature (° C.) | Li recovery efficiency (%) |
|---|---|---|---|---|---|---|
| 01 | 100 | 40 | 25 | 12.9 | 116 | 54 |
| 02 | 100 | 50 | 25 | 15.9 | 121 | 68 |
| 03 | 100 | 60 | 25 | 18.6 | 131 | 79 |
| 04 | 100 | 70 | 25 | 18.7 | 147 | 80 |
| 05 | 100 | 56 | 110 | 8.6 | 124 | 36.5 |
| 06 | 100 | 56 | 80 | 11.8 | 124 | 50.3 |
| 07A | 100 | 56 | 25 | 18.3 | 124 | 78 |
| 07B | 34 | 19 | — | 0 | 200 | 0 |

TABLE 6

| Test | Initial volume (mL) | Condensate (mL) | Filtration temperature (° C.) | Recovered crystal before rinsing (g) | Final boiling temperature (° C.) | Li recovery efficiency (%) |
|---|---|---|---|---|---|---|
| 08 | 100 | 41.5 | 25 | 12.95 | 118.5 | 52 |
| 09 | 100 | 50.5 | 25 | 15.56 | 122.5 | 64 |
| 10 | 100 | 60.0 | 25 | 19.57 | 131.0 | 77 |

The person skilled in the art will understand that in regards to the energetic costs associated with the recovery of lithium sulfate at different temperatures, a tradeoff as to be made between the water removed, the lithium recycled at the electromembrane process and the efficiency of the roasting process downstream. For example, under certain conditions the costs related to heating may be significantly high and therefore, filtration will advantageously be carried out at higher temperature in order to be able to recover as much heat as possible. However, when energy costs permitting, it is possible to carry out the solid-liquid temperature at a lower temperature in order to precipitate a higher percentage of lithium sulfate.

Example 6

Roasting Tests with Treated By-Product

Studies were carried out using composition A and composition B determined in Example 5 as a sulfate reagent using the procedure described in Example 1. The acidic mixture was then baked in a muffle furnace under standard conditions using a furnace temperature of 250° C. for a baking time at the target temperature of 30 minutes. The roasted β-spodumene was then subjected to a water leach to determine the extent of Li conversion. The roasting tests results for trials using various compositions and stoichiometric excess are summarized in Table 7.

TABLE 7

| Test | Sulfate Reagent | Stoichiometric Excess, % | % Lithium Extraction |
| --- | --- | --- | --- |
| Bisulfate roasting test T29 | Composition A | 10% H2SO4 | 71.6 |
| Bisulfate roasting test T30 | Composition A | 25% H2SO4 | 78.6 |
| Bisulfate roasting test T31 | Composition A | 40% H2SO4 | 87.9 |
| Bisulfate roasting test T32 | Composition B | 25% H2SO4 | 89.0 |
| Bisulfate roasting test T33 | Composition B | 45% H2SO4 | 94.2 |

The extraction values in Table 7 are calculated based on the Li content in the water leach residue and the initial feed.

It is clear from the above results that compared to Li extraction results obtained in Example 2 and 4, composition A shows similar performances while having the benefits of recycling directly lithium sulfate to the electromembrane process as mentioned in Example 5.

It is clear from the above results that compared to Li extraction results obtained in Example 2 and 4, composition B shows better performances while having the benefits of recycling directly lithium sulfate to the electromembrane process as mentioned in Example 5.

All publications, patents and patent applications are herein incorporated by reference in their entirety to the same extent as if each individual publication, patent or patent application was specifically and individually indicated to be incorporated by reference in its entirety. Where a term in the present disclosure is found to be defined differently in a document incorporated herein by reference, the definition provided herein is to serve as the definition for the term.

What is claimed is:

1. A method for preparing lithium hydroxide, said method comprising:
    mixing a lithium-containing material with an acidic aqueous composition comprising sulfuric acid and optionally comprising lithium sulfate and thereby obtaining a mixture;
    roasting said mixture to obtain a roasted, lithium-containing material;
    leaching said roasted material to obtain a first aqueous composition comprising lithium sulfate;
    submitting said first aqueous composition comprising lithium sulfate to an electromembrane process to at least partially convert said lithium sulfate into lithium hydroxide and to obtain a second aqueous composition comprising lithium sulfate and sulfuric acid;
    increasing concentration of sulfuric acid in said second aqueous composition by removing water from said second aqueous composition;
    recovering lithium sulfate from said second aqueous composition thereby obtaining an aqueous composition reduced in lithium sulfate;
    reusing said recovered lithium sulfate in said electromembrane process; and
    using said aqueous composition reduced in lithium sulfate as said acidic aqueous composition comprising sulfuric acid and optionally comprising lithium sulfate for mixing with said lithium-containing material and to obtain said mixture.

2. The method of claim 1, wherein said sulfuric acid is present in a stoichiometric excess of from about 10% to about 40%, based on the amount of lithium in said lithium-containing material.

3. The method of claim 1, wherein said mixture is roasted at a roasting temperature of from about 150° C. to about 400° C.

4. The method of claim 2, wherein said mixture is roasted at a roasting temperature of from about 200° C. to about 300° C.

5. The method of claim 1, wherein said lithium-containing material is a lithium-containing ore.

6. The method of claim 5, wherein said lithium-containing ore comprises 3-spodumene or jadarite.

7. The method of claim 4, wherein said roasted lithium-containing material is leached with water to obtain said first aqueous composition comprising said lithium sulfate.

8. The method of claim 1, wherein said lithium-containing material further comprises a leachable metal impurity and said first aqueous composition comprising lithium sulfate is further treated to remove at least a portion of said leachable metal impurity from said first aqueous composition comprising said lithium sulfate.

9. The method of claim 1, wherein removing water from said second aqueous composition is carried out by heating said second aqueous composition.

10. The method of claim 9, wherein said second aqueous composition is heated at a temperature of about 100° C. to about 300° C.

11. The method of claim 10, wherein said second aqueous composition is heated under vacuum.

12. The method of claim 1, wherein removing water from said second aqueous composition is carried out by a membrane dehydration process or by a reverse osmosis membrane process.

13. The method of claim 1, wherein removing water from said second aqueous composition causes precipitation of said lithium sulfate from said second aqueous composition in the form of lithium sulfate monohydrate.

14. The method of claim 1, wherein removing water from said second aqueous composition causes a substantially selective precipitation of lithium sulfate from said second aqueous composition in the form of lithium sulfate monohydrate in comparison to precipitation of lithium sulfate from said second aqueous composition in the form of anhydrous lithium sulfate.

15. The method of claim 1, wherein removing water from said second aqueous composition causes crystallization of lithium sulfate from said second aqueous composition in the form of lithium sulfate monohydrate.

16. The method of claim 13, wherein said lithium sulfate monohydrate is recovered from said second aqueous composition by carrying out a solid-liquid separation to recover said lithium sulfate monohydrate.

17. The method of claim 1, wherein said lithium sulfate is recovered from said second aqueous composition in the form of lithium sulfate monohydrate and said lithium sulfate monohydrate is reused for said electromembrane process.

18. The method of claim 16, wherein the solid-liquid separation is carried out at a temperature of about 15° C. to about 130° C.

19. The method of claim 16, wherein the solid-liquid separation is carried out at a temperature of about 25° C. to about 125° C.

20. The method of claim 1, wherein said sulfuric acid is present in a stoichiometric excess of from about 20% to about 40%, based on the amount of lithium in said lithium-containing material.

21. The method of claim 1, wherein said sulfuric acid is present in a stoichiometric excess of from about 55% to about 60%, based on the amount of lithium in said lithium-containing material.

22. The method of claim 9, wherein said second aqueous composition is heated at a temperature of about 110° C. to about 130° C.

23. The method of claim 5, wherein said lithium-containing ore comprises β-spodumene.

24. The method of claim 10, wherein said second aqueous composition is heated at atmospheric pressure.

* * * * *